United States Patent
Murakami et al.

(10) Patent No.: US 7,567,954 B2
(45) Date of Patent: *Jul. 28, 2009

(54) SENTENCE CLASSIFICATION DEVICE AND METHOD

(75) Inventors: Eiji Murakami, Tokyo (JP); Takao Terano, Tokyo (JP)

(73) Assignee: Yamatake Corporation, Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 10/563,311

(22) PCT Filed: Jul. 1, 2004

(86) PCT No.: PCT/JP2004/009341

§ 371 (c)(1),
(2), (4) Date: Dec. 30, 2005

(87) PCT Pub. No.: WO2005/004004

PCT Pub. Date: Jan. 13, 2005

(65) Prior Publication Data

US 2006/0155662 A1    Jul. 13, 2006

(30) Foreign Application Priority Data

Jul. 1, 2003  (JP) .............................. 2003-189716
Feb. 27, 2004 (JP) .............................. 2004-053419

(51) Int. Cl.
    G06F 15/18 (2006.01)
(52) U.S. Cl. ................ 707/3; 707/1; 707/6; 707/104.1; 382/154; 382/224; 706/20; 704/9
(58) Field of Classification Search ........................ None
    See application file for complete search history.

(56) References Cited

U.S. PATENT DOCUMENTS 5,675,819 A * 10/1997 Schuetze .................... 704/10
6,067,259 A *  5/2000 Handa et al. ............... 365/200
6,243,723 B1 * 6/2001 Ikeda et al. ................ 715/514

(Continued)

FOREIGN PATENT DOCUMENTS

JP          2002-108894 A      4/2002

(Continued)

OTHER PUBLICATIONS

Hotta et al., "Extraction of Fuzzy Clusters From Weighed Graphs", The Transactions of the Institute of Electronics, Information and Communication Engineers, Mar. 1, 2001, vol. J84-A, No. 3, pp. 351-359.

(Continued)

*Primary Examiner*—Cam Y Truong
*Assistant Examiner*—Shyue Jiunn Hwa
(74) *Attorney, Agent, or Firm*—Blakely, Sokoloff, Taylor & Zafman LLP

(57) ABSTRACT

A DT matrix generation means (11) generates a DT matrix (11A) from each document (D) in a document set (21) and each term (T) in a term list (22). A DT matrix transformation means (12) generates a transformed DT matrix (11B) by performing DM decomposition of the DT matrix (11A). A document classification means (13) extracts and outputs, for each cluster appearing on the transformed DT matrix (11B), each document (D) belonging to the cluster as one classification (subset).

8 Claims, 16 Drawing Sheets

U.S. PATENT DOCUMENTS

| | | | |
|---|---|---|---|
| 7,024,400 B2* | 4/2006 | Tokuda et al. | 706/56 |
| 2001/0032029 A1* | 10/2001 | Kauffman | 700/99 |
| 2001/0037324 A1* | 11/2001 | Agrawal et al. | 707/1 |
| 2002/0031254 A1* | 3/2002 | Lantrip et al. | 382/154 |
| 2002/0138466 A1* | 9/2002 | Arning et al. | 707/1 |
| 2003/0216951 A1* | 11/2003 | Ginis et al. | 705/8 |
| 2003/0221163 A1* | 11/2003 | Glover et al. | 715/501.1 |
| 2004/0205457 A1* | 10/2004 | Bent et al. | 715/500 |
| 2006/0288029 A1* | 12/2006 | Murakami et al. | 707/101 |

FOREIGN PATENT DOCUMENTS

| | | |
|---|---|---|
| WO | WO 02/091106 | 11/2002 |

OTHER PUBLICATIONS

Sato et al., "A Graph Theoretical Analysis of Semantic Relation Among Words", The Institute of Electronics, Mar. 18, 1991, vol. 90, No. 482, pp. 25-32.

Murakami et al., "Relevance Knowledge Acquisition by Human Computer Interaction", SIG-KBS-A304, The Japanese Society for Artificial Intelligence, Mar. 1, 2004, pp. 207-212.

"Extraction and Weighting of Indexing Term" Kita et al.; *Information Search Algorithm*, 2002, Kyoritsu Publishing Co., pp. 27-49.

"Text Classification—Leaning Theory Sample Fair" Johoshori; vol. 42, 1st issue; Jan. 2001.

Matsukawa, Tomoyoshi, et al., "An algoithm of word clustering from co-occurence data using DM decomposition and statistical estimation," May 19, 1989, vol. 89, No. 42, pp. 1-8.

Sato, et al., "A Graph Theoretical Analysis of Semantic Relation Among Words," IEICE Technical Report, Japan, The Institute of Electronics, Information and Communication Engineers, Mar. 18, 1991, vol. 90, No. 482, pp. 25-32.

* cited by examiner

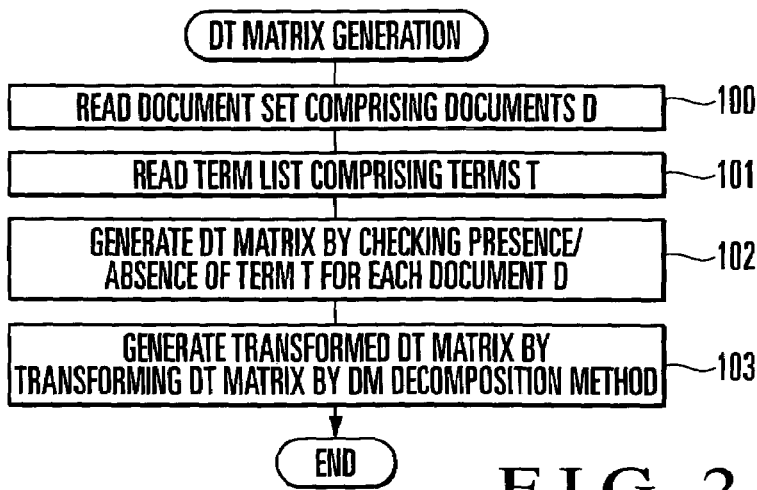

FIG. 2

DOCUMENT SET

| Di | ANSWERER | DOCUMENT CONTENTS |
|---|---|---|
| 1 | W0039411 | KARAOKE IS ALSO FUN, ISN'T IT ? I CAN SING IN RHYTHM AND AM NEVER STOPPED FORM SINGING EVEN IF I MAKE A MISTAKE. WHEN I SING, PEOPLE AROUND ME MAKE SEVERE JUDGMENT, SO I NEED TO PUSH MYSELF INTO ... |
| 351 | M0014787 | IS IT ESCAPE FROM REALITY ? THAT MAY BE SO, BUT I DO NOTHING BUT SLEEP WHEN I FEEL STRESSED. A GOOD DREAM MAKES ME FEEL FINE ... |
| 289 | M0010523 | TAKING A BATH WITH BATH AGENT HAVING FAVORITE SCENT MAKES ME FEEL RELAXED. READING A BOOK WHILE TAKING A BATH RELIEVES STRESS, SO I TAKE A BOOK INTO ... |
| 319 | W0013732 | GETTING A MASSAGE MAKES ME FEEL HAPPY. HOWEVER, GETTING A MASSAGE FROM SOMEONE WHO DOES NOT KNOW CORRECT PRESSURE POINTS MAKES ME FEEL STRESSED. THAT IS, YOU NEED TO GET A MASSAGE FROM YOUR FAVOURITE ... |
| 57 | W0039210 | WELL, THAT IS GOOD. IT SOUNDS COMFORTABLE ! SWINGING AND MISSING ALL THE TIME LIKE ME, HOWEVER, MAY MAKE YOU RATHER FEEL STRESSED, ... SUCH STRESS IS ... |
| 72 | W0039200 | I ALSO FREQUENT THE POOL. HOWEVER, WHEN I PUSH MYSELF TOO HARD, I WILL GET TIRED. SO I CASUALLY SWIM AND WALK FOR ABOUT 30 MINUTES ... |
| 111 | W0012712 | I TOOK A TRIP THE OTHER DAY FOR THE FIRST TIME IN YEARS, ALTHOUGH IT IS JUST AN OVERNIGHT TRIP. HAVING NO NEED TO PREPARE FOR MEALS AND MAKE BEDS MAKES ME SO HAPPY ... |
| 337 | W0013147 | AFTER ALL, GARDENING IS MY WAY OF STRESS RELIEVE. ALTHOUGH MY HUSBAND AND CHILDREN COMPLAIN ALL THE TIME, FLOWERS BLOOM WITHOUT ANY COMPLAINT ... |
| 360 | W0015958 | I HAVE A THREE-YEAR-OLD SON. WE OFTEN GO TO A PARK. ALTHOUGH A GROWN-UP FEELS TOO SHY TO RIDE ON A SWING, YOU CAN... WITH YOUR CHILD. |
| 32 | W0016759 | I AM ALSO A BAD MARRIED WOMAN. I CANNOT SAY WITH CONFIDENCE THAT I PERFECTLY MANAGE HOUSEHOLD CHORES. I GO OUT AT NIGHT ONCE PER TWO OR THREE MONTHS. AT ABOUT 7 O'CLOCK ... |

FIG. 3

TERM LIST

| Tj | KEYWORD FRONT | | KEYWORD BACK | | IMPORTANCE |
|---|---|---|---|---|---|
| 1 | STRESS | NOUN - GENERAL | RELIEF | NOUN - GENERAL | 256 |
| 2 | RELIEF | NOUN - GENERAL | STRESS | NOUN - GENERAL | 256 |
| 3 | STRESS | NOUN - GENERAL | WORK | NOUN - GENERAL | 117 |
| 4 | WORK | NOUN - GENERAL | STRESS | NOUN - GENERAL | 117 |
| 5 | TIME | NOUN - UNINDEPENDENCE - ADVERB | STRESS | NOUN - GENERAL | 116 |
| 6 | SMOKE | VERB - INDEPENDENCE | STRESS | NOUN - GENERAL | 99 |
| 7 | -TIC | NOUN - SUFFIX - ADJECTIVE VERB STEM | STRESS | NOUN - GENERAL | 88 |
| 8 | GO | VERB - INDEPENDENCE | STRESS | NOUN - GENERAL | 86 |
| 9 | NIGHTCAP | NOUN - GENERAL | EVENING DRINK | NOUN - GENERAL | 85 |
| 10 | EVENING DRINK | NOUN - GENERAL | NIGHTCAP | NOUN - GENERAL | 85 |
| 11 | MAN | NOUN - SUFFIX - COUNTER | STRESS | NOUN - GENERAL | 83 |
| 12 | CHILD | NOUN - GENERAL | STRESS | NOUN - GENERAL | 77 |

DT MATRIX

| | | DOCUMENT D | | | | | | | |
|---|---|---|---|---|---|---|---|---|---|
| | | D1 | D2 | D3 | D4 | D5 | D6 | ........... | Dm |
| TERM T | T1 | 0 | 1 | 0 | 0 | 0 | 0 | | 0 |
| | T2 | 0 | 1 | 0 | 1 | 0 | 0 | | 0 |
| | T3 | 0 | 0 | 0 | 0 | 0 | 1 | | 0 |
| | T4 | 1 | 0 | 0 | 0 | 0 | 0 | ........... | 0 |
| | T5 | 0 | 0 | 0 | 0 | 0 | 0 | | 1 |
| | T6 | 0 | 0 | 0 | 0 | 1 | 0 | | 1 |
| | T7 | 1 | 0 | 0 | 0 | 0 | 0 | | 0 |
| | T8 | 0 | 0 | 0 | 0 | 0 | 0 | | 0 |
| | Tn | 0 | 0 | 0 | 1 | 0 | 0 | ........... | 0 |

⎯11A

0 = NO TERM Tj EXISTS IN DOCUMENT Di
1 = TERM Tj EXISTS IN DOCUMENT Di

FIG. 5

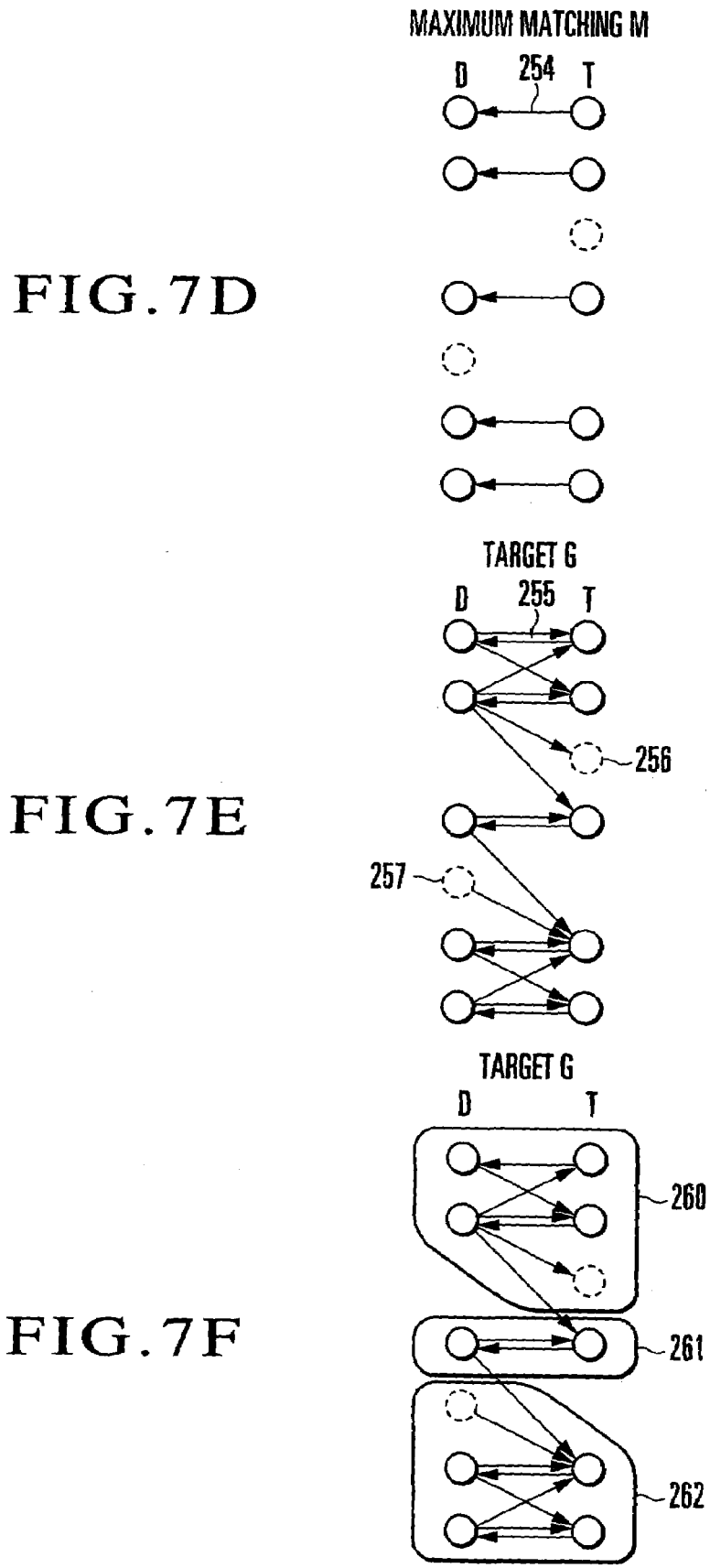

SENTENCE CLASSIFICATION DEVICE AND METHOD

The present patent application is a non-provisional application of International Application No. PCT/JP2004/009341, filed Jul. 1, 2004.

TECHNICAL FIELD

The present invention relates to a sentence classification device and method and, more particularly, to a sentence classification device and method which classify documents in accordance with the contents of the documents.

BACKGROUND ART

In the highly information-oriented society, with advances in information processing and communication technologies, there is being provided an environment in which an enormous amount of computerized information can be easily acquired. The information acquired by using such an environment is also enormous in data amount, and hence desired information needs to be efficiently and accurately comprehended. As a technique of analyzing the contents of information, a technique of classifying documents constituting each piece of information in accordance with the contents of the documents has been studied.

As a technique of classifying documents, there has been proposed a technique of preparing labels indicating the contents of classifications in advance, analyzing the contents of the respective documents according to a predetermined algorithm, and classifying the respective documents for each prepared label (for example, Masaaki Nagata, "Text Classification—Learning Theory Sample Fair", Johoshori, Volume 42, first issue, January, 2001). According to such a technique, when documents are to be classified, labels indicating the contents of classifications are prepared, and the labels are accurately assigned to the respective documents by using various kinds of learning algorithms, thereby classifying the respective documents for each label.

DISCLOSURE OF INVENTION

Problem to be Solved by the Invention

In such a conventional document classification technique, however, since labels must be prepared in advance, suitable labels must be selected and set in advance by comprehending the contents of documents as classification targets to some extent. In selecting labels, therefore, if the amount of documents is large and their contents cover a wide range, a heavy work load is required. In addition, since labels used for classification are subjectively selected, the obtained classifications themselves become restrictive. Therefore, documents cannot be classified from a new viewpoint beyond a conceivable range or from a broader viewpoint.

The present invention has been made to solve the above problems, and has as its object to provide a sentence classification device and method which can flexibly perform classification without being subjective with a relatively light work load.

Means of Solution to the Problem

A sentence classification device according to the present invention comprises a term list having a plurality of terms each comprising not less than one word, DT matrix generation means for generating a DT matrix two-dimensionally expressing a relationship between each document contained in a document set and the each term, DT matrix transformation means for generating a transformed DT matrix having clusters having blocks of associated documents by transforming the DT matrix obtained by the DT matrix generation means on the basis of a DM decomposition method used in a graph theory, and classification generation means for generating classifications associated with the document set on the basis of a relationship between each cluster on the transformed DT matrix obtained by the DT matrix transformation means and the each document classified according to the clusters.

In this case, this device may comprise, as the classification generation means, document classification means for outputting, for each cluster on the transformed DT matrix obtained by the DT matrix transformation means, documents belonging to the cluster as the same classification.

Alternatively, this device may comprise, as the classification generation means, virtual representative document generation means for generating a virtual representative document, for each cluster on a transformed DT matrix, from a term of each document belonging to the cluster, and large classification generation means for generating a large classification of documents by repeatedly performing clustering processing of setting a DT matrix generated by the DT matrix generation means in an initial state, causing the virtual representative document generation means to generate a virtual representative document for each cluster on a transformed DT matrix generated from the DT matrix by the DT matrix transformation means, generating a new DT matrix used for next clustering processing by adding the virtual representative document to the transformed DT matrix and deleting documents belonging to the cluster of the virtual representative document from the transformed DT matrix, and outputting, for the each cluster, information associated with the documents constituting the cluster as large classification data.

A sentence classification method according to the present invention comprises the DT matrix generation step of generating a DT matrix two-dimensionally expressing a relationship between each document contained in a document set and each term of a term list having a plurality of terms each comprising not less than one word, the DT matrix transformation step of generating a transformed DT matrix having clusters having blocks of associated documents by transforming the DT matrix on the basis of a DM decomposition method used in a graph theory, and the classification generation step of generating classifications associated with the document set on the basis of a relationship between each cluster on the transformed DT matrix and the each document classified according to the clusters.

In this case, this method may comprise, as the classification generation step, the document classification step of outputting, for each cluster on the transformed DT matrix, documents belonging to the cluster as the same classification.

Alternatively, this method may comprise, as the classification generation step, the virtual representative document generation step of generating a virtual representative document, for each cluster on a transformed DT matrix, from a term of each document belonging to the cluster, and the large classification generation step of generating a large classification of documents by repeatedly performing clustering processing comprising the step of setting a DT matrix generated in the DT matrix generation step in an initial state, generating a virtual representative document in the virtual representative document generation step for each cluster on a transformed DT matrix generated from the DT matrix in the DT matrix transformation step, the step of generating a new DT matrix used for next clustering processing by adding the virtual representative document to the transformed DT matrix and deleting documents belonging to the cluster of the virtual representative document from the transformed DT matrix, and the step of outputting, for the each cluster, information associated with the documents constituting the cluster as large classification data.

Effects of the Invention

According to the present invention, a DT matrix generated from the respective documents in a document set and the respective terms in a term list is subjected to DM decomposition, and for each cluster on the obtained transformed DT matrix, each document belonging to the cluster is extracted as one classification. The respective documents can therefore be classified without preparing any label corresponding to each classification in advance. This eliminates the necessity to select appropriate labels by comprehending the contents of each document as a classification target to some extent as in the prior art. Therefore, terms can be comprised of words selected according to a criterion which is not directly associated with classification, e.g., the frequency of occurrence, thereby greatly reducing the work load for label selection. This makes it possible to flexibly perform classification without being biased by any subjective criteria prepared in advance such as labels with a relatively light work load.

In addition, since clustering processing of generating a new cluster by performing transformation processing with respect to a DT matrix and generating a new DT matrix by replacing the cluster with its virtual representative document is repeatedly executed, new clusters, i.e., larger clusters including clusters, i.e., large classifications, can be sequentially obtained from new DT matrices without preparing any label, unlike the prior art. Therefore, the respective documents in the document set can be classified from a broader viewpoint beyond a conceivable range. This makes it possible to flexibly perform classification without being biased by any subjective criteria prepared in advance such as labels with a relatively light work load.

BRIEF DESCRIPTION OF DRAWINGS

FIG. 2 is a flowchart showing DT matrix generation processing;

FIG. 3 is a view showing an example of the arrangement of a document set;

FIG. 4 is a view showing an example of the arrangement of a term list;

FIG. 5 is a view showing an example of the arrangement of a DT matrix;

FIG. 7D is a bipartite graph showing a process of DM decomposition;

FIG. 7E is a bipartite graph showing a process of DM decomposition;

FIG. 7F is a bipartite graph showing a process of DM decomposition;

BEST MODE FOR CARRYING OUT THE INVENTION

The embodiments of the present invention will be described next with reference to the accompanying drawings.

First Embodiment

Figure 1:
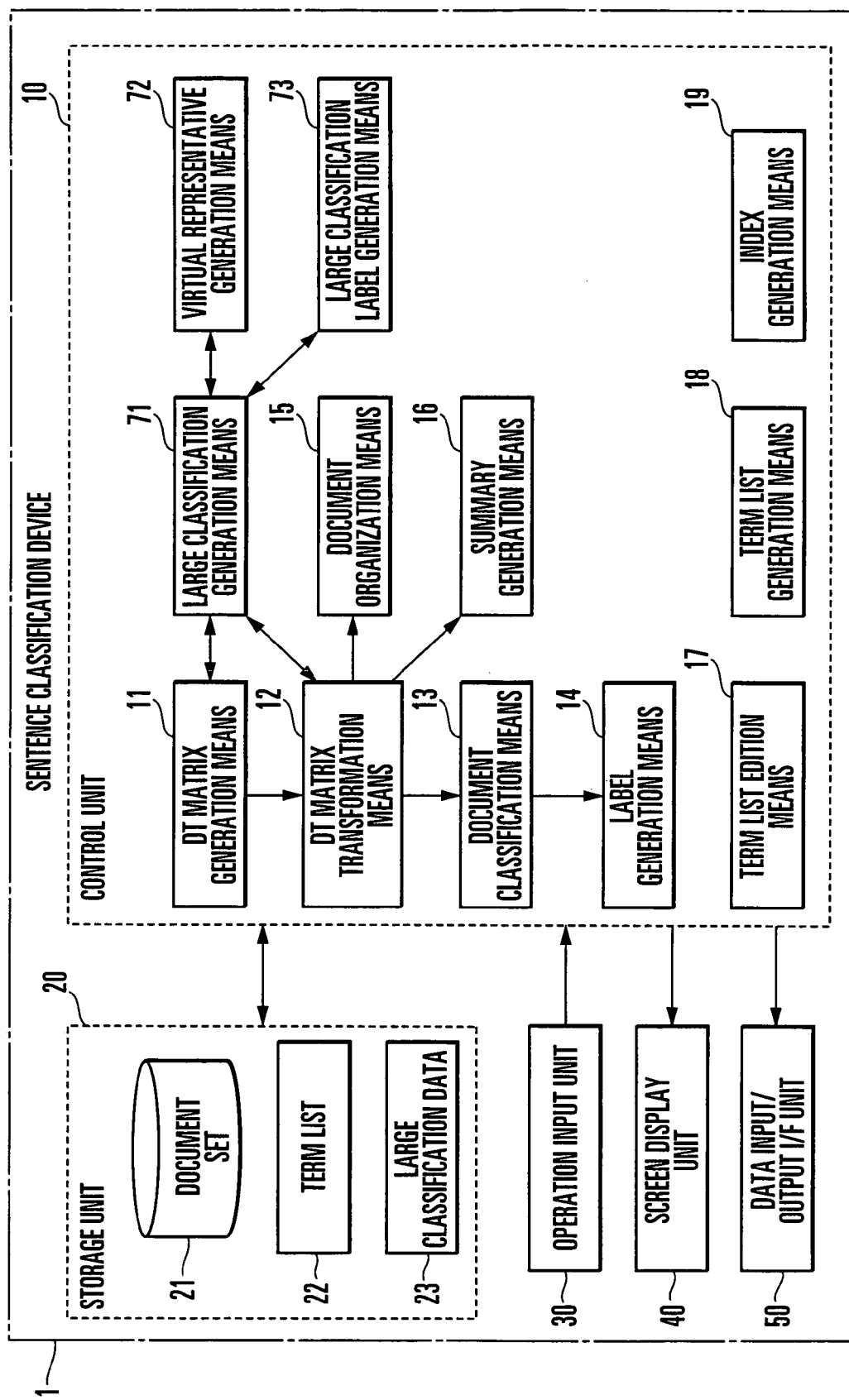
FIG. 1 is a block diagram showing the arrangement of a sentence classification device according to an embodiment of the present invention.

A sentence classification device according to the first embodiment of the present invention will be described first with reference to FIG. 1. FIG. 1 is a block diagram showing the arrangement of a sentence classification device according to the first embodiment of the present invention. A sentence classification device 1 is comprised of a computer as a whole, and is provided with a control unit 10, storage unit 20, operation input unit 30, screen display unit 40, and data input/output interface unit (to be referred to as a data input/output I/F unit hereinafter) 50.

The control unit 10 is comprised of a microprocessor such as a CPU and its peripheral circuits, and executes programs (not shown) stored in advance in the storage unit 20 to implement various kinds of functional means for document classification processing by making the above hardware and the programs cooperate with each other. The storage unit 20 is comprised of a storage device such as a hard disk or a memory, and stores various kinds of information used for processing by the control unit 10. Such information stored in the storage unit 20 includes a document set 21 comprising documents as classification targets, a term list 22 comprising a plurality of important terms for the comprehension of the contents of each document, and large classification data 23 indicating the result obtained by largely classifying the documents.

The operation input unit 30 is comprised of input devices such as a keyboard and a mouse. The operation input unit 30 detects operation by a user and outputs the resultant information to the control unit 10. The screen display unit 40 is comprised of an image display device such as a CRT or an LCD, and displays/outputs the processing contents in the control unit 10 and processing results. The data input/output I/F unit 50 is a circuit unit for connection to an external device (not shown) and a communication network (not shown), and is used to exchange obtained processing results and programs executed by the control unit 10 in addition to the document set 21, term list 22, and large classification data 23.

The control unit 10 is provided with, as functional means, a DT matrix generation means 11, DT matrix transformation means 12, document classification means (classification generation means) 13, label generation means 14, document organization means 15, summary generation means 16, term list edition means 17, term list generation means 18, index generation means 19, large classification generation means (classification generation means) 71, virtual representative generation means (classification generation means) 72, and large classification label generation means 73.

In this embodiment, a DT matrix is a matrix which two-dimensionally expresses the relationship between each document D and each term T. In this case, the above relationship is based on the presence/absence of the term T in the document D. The documents D and terms T are made to correspond to the columns and rows of the matrix. The relationship between the documents D and the terms T is expressed such that if a given document Di contains a given term Tj, the j and i components of the DT matrix are set to "1"; otherwise, they are set to "0". In addition, this DT matrix is regarded as an expression form of a bipartite graph, and the DT matrix is transformed on the basis of the DM decomposition method used in the graph theory of bipartite graphs. The respective documents D are then classified on the basis of clusters appearing on the obtained transformed DT matrix.

The DT matrix generation means 11 is a functional means for generating a DT (Document-Term) matrix from the respective documents D (Document) as classification targets and the respective terms (Term) constituting the term list 22. The DT matrix transformation means 12 is a functional means for transforming the DT matrix generated by the DT matrix generation means 11 on the basis of the DM (Dulmage-Mendelsohn) decomposition method. The DM decomposition method is a process of transforming a DT matrix into a triangular matrix by performing row operation (operation of interchanging tows) or column operation (operation of interchanging columns). The DT matrix transformed into the triangular matrix is called the transformed DT matrix.

The document classification means 13 is a functional means for classifying the respective documents of the document set 21 on the basis of blocked clusters appearing on the transformed DT matrix obtained by the DT matrix transformation means 12. The label generation means 14 is a functional means for outputting, for each cluster, the term T strongly connected to each document D belonging to the cluster as the label of the cluster. The document organization means 15 is a functional means for interchanging the respective documents of the document set 21 on the basis of the arrangement order of the documents D in the transformed DT matrix and outputting the resultant data. The summary generation means 16 is a functional means for outputting a sentence containing the term T strongly connected to the document D as a summary of the document D.

The term list edition means 17 is a functional means for adding/deleting the term T with respect to the term list 22 in the storage unit 20 in accordance with operation from the operation input unit 30. The term list generation means 18 is a functional means which extracts words which effectively express features of the respective documents D, i.e., important words, by analyzing each document D contained in the document set 21 of the storage unit 20 and generates the term list 22 by using the terms T comprising the important words. The index generation means 19 is a functional means for generating an index indicating an influence on classification by edition with respect to the term list edited by the term list edition means 17 on the basis of the DT matrices before and after the edition.

The large classification generation means 71 is a functional means which repeatedly executes DT matrix transformation processing as clustering processing in the DT matrix transformation means 12 using the DM decomposition method, and generates large classifications of the respective documents of the document set 21 on the basis of the clusters obtained from the transformed DT matrix obtained by each clustering process. The virtual representative generation means 72 is a functional means for generating virtual representative documents virtually representing documents contained in the clusters from the clusters obtained from the transformed DT matrix at the time of the generation of large classifications. The large classification label generation means 73 is a functional means for generating the labels of the respective clusters, i.e., the large classifications, generated by the large classification generation means 71. Note that the large classification generation means 71, virtual representative generation means 72, and large classification label generation means 73 are used in the second embodiment described later.

[Operation of First Embodiment]

The operation of the sentence classification device according to the first embodiment of the present invention will be described next with reference to FIG. 2. FIG. 2 is a flowchart showing DT matrix generation processing in the sentence classification device according to the first embodiment of the present invention. The control unit 10 starts the DT matrix generation processing in FIG. 2 in accordance with an instruction from the operation input unit 30 to generate a DT matrix used for document classification processing. First of all, the DT matrix generation means 11 reads the document set 21 stored in the storage unit 20 (step 100), and reads the term list 22 (step 101).

FIG. 3 shows an example of the arrangement of the document set 21. This example is an aggregate of documents freely written about "stress" by many answerers on the Web. For each document D, a document number Di for the management of the document D and the identification information of the answerer who has written the document are assigned. FIG. 4 shows an example of the arrangement of the term list 22. In the term list 22, the respective terms T are formed from the types of important words obtained by analyzing the respective documents D on the basis of a predetermined algorithm and from contextual relationships of the words. For each term T, a term number Tj for the management of the term T is assigned.

Each term T is comprised of a keyword front located on the front side of two important words and a keyword back located on the back side. For each keyword, a word indicating the content of the keyword and the part-of-speech attribute type of the word are defined. In addition, an importance indicating a weight in the use for document classification is made to correspond to each term T, which is calculated from the document set 21 by term list generation processing (to be described later). For example, term "1" is comprised of the two keywords "stress" and "relief", and their positional relationship is defined such that "stress" is located on the front side.

The DT matrix generation means 11 checks, for each document in the document set 21, whether each term T of the term list 22 which has an importance equal to or more than a given threshold exists, and generates a DT matrix on the basis of the check result (step 102). FIG. 5 shows an example of the arrangement of a DT matrix. In a DT matrix 11A, the terms T are arranged in the row direction (vertical direction), and the documents D are arranged in the column direction (horizontal direction). At the intersection between each document D and the corresponding term T, the presence/absence of the term T in the document D is expressed by a binary number. In this case, if the term T exists in the document D, "1" is set; otherwise, "0" is set. In this example, therefore, it can be known that a document D1 contains terms T4 and T7, and a term T2 is contained in documents D2 and D4.

Subsequently, the DT matrix transformation means 12 generates a transformed DT matrix 11B by transforming the DT matrix 11A, generated by the DT matrix generation means 11 in this manner, on the basis of the DM decomposition method (step 103), and stores the matrix in the storage unit 20, thereby terminating the series of matrix generation processes. In general, according to the graph theory, the DM decomposition method is used as a technique of separating a bipartite graph comprising points belonging to two sets and edges connecting the points on the basis of the relevance between the respective points. In this embodiment, in consideration of the fact that the DT matrix 11A can be regarded as an expression form of a bipartite graph in which the documents D are connected to the terms T with edges, the DM decomposition method in the graph theory is applied to the DT matrix 11A, and the documents D are classified on the basis of the obtained transformed DT matrix.

[DM Decomposition Processing]

Figure 6:
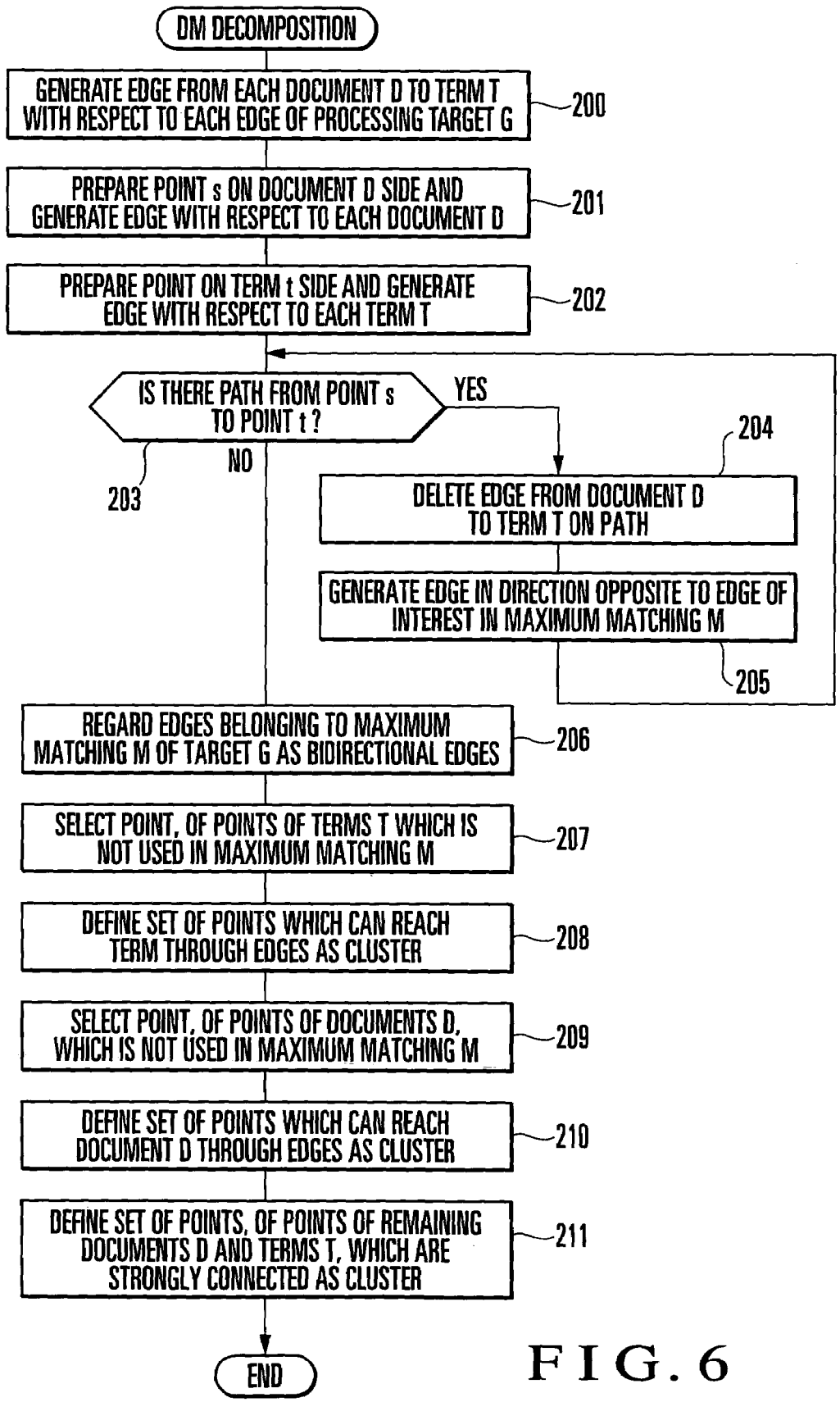
FIG. 6 is a flowchart showing DM decomposition processing.

DM decomposition processing in a bipartite graph will be described with reference to FIGS. 6 and 7A to 7F. FIG. 6 is a flowchart showing DM decomposition processing. FIGS. 7A to 7F are bipartite graphs showing the process of DM decomposition. The following description will exemplify a case wherein a bipartite graph G comprised of two point sets of the documents D and the terms T and edges connecting the points is regarded as a processing target, and the target is separated into a plurality of graphs by the DM decomposition method. Note that in these processes, the following operation is repeatedly performed: various kinds of data are read out from a memory in the control unit 10 or the storage unit 20, the control unit 10 performs predetermined computation for the data, and the resultant data are stored again.

Figure 7A:
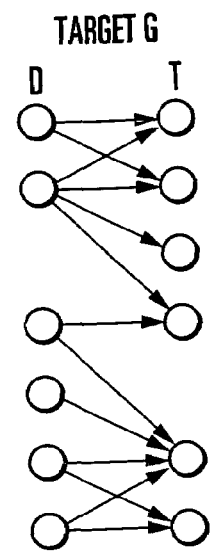
FIG. 7A is a bipartite graph showing a process of DM decomposition.
Figure 7B:
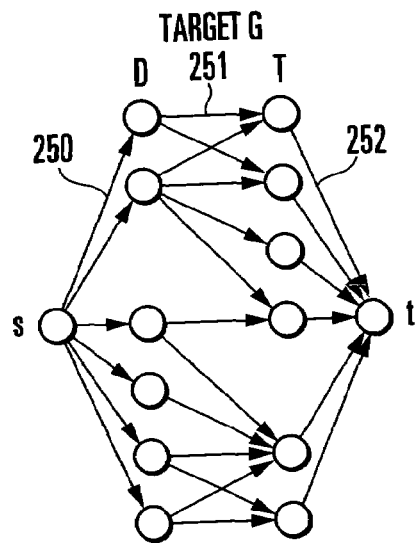
FIG. 7B is a bipartite graph showing a process of DM decomposition.

First of all, as shown in FIG. 7A, with regard to the respective edges of the bipartite graph G as the processing target, effective edges extending from the documents D to the terms T are generated (step 200). As shown in FIG. 7B, then, a point s is prepared on the document D side, and effective edges extending from the point s to the respective points of the documents D are generated (step 201). In the same manner, a point t is prepared on the term T side, and effective edges extending from the respective points of the terms T to the point t are generated (step 202).

Figure 7C:
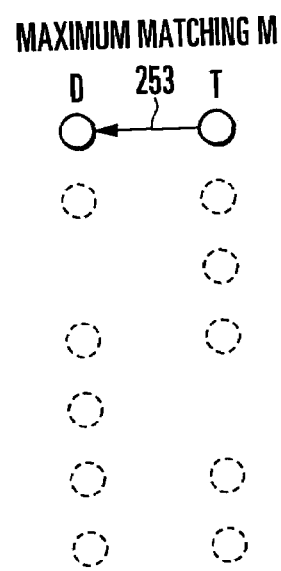
FIG. 7C is a bipartite graph showing a process of DM decomposition.

A search is then made for a path extending from the point s to the point t through these edges (step 203). For example, referring to FIG. 7B, the point t can be reached from the point s through the path comprising edges 250, 251, and 252. If such a path exists (step 203: YES), the respective edges constituting the path are deleted (step 204), and an effective edge in the direction opposite to the effective edge extending from the document D to the term T on the path is generated in a maximum matching M as an empty bipartite graph in the initial state (step 205). The flow then returns to step 203 to search for the next path. Referring to FIG. 7C, an effective edge 253 in the direction opposite to the effective edge 251 is generated in the maximum matching M. If it is determined in step 203 that no new path is found upon completion of all path searches (step 203: NO), the maximum matching M is accomplished.

After the maximum matching M shown in FIG. 7D is accomplished, each effective edge 254 belonging to the maximum matching M is contained in the processing target G (step 206). As a consequence, as shown in FIG. 7E, each edge 255 selected as that of the maximum matching M is comprised of an effective edge extending from the document D to the term T and an effective edge in the opposite direction.

A point which is not used for the maximum matching M, e.g., a free point 256, is selected from the points of the terms T (step 207). As shown in FIG. 7F, then a set of points which can reach the free point 256 through the respective edges of the processing target G is defined as a cluster 260 (step 208). Likewise, a point which is not used for the maximum matching M, e.g., a free point 257, is selected from the points of the documents D (step 209), and a set of points which can reach the free point 257 through the respective edges of the processing target G is defined as a cluster 262 (step 210). Of the points of the remaining documents D and terms T, a set of points having paths through which they can reach each other in the two directions, i.e., a set of strongly connected points, is defined as a cluster 261 (step 211), thus terminating the series of DM decomposition processes. In this manner, according to the known DM decomposition method, clusters are generated in a predetermined order to obtain a transformed DT matrix in the form of a triangular matrix.

In the above manner, the control unit 10 executes the DT matrix generation processing in FIG. 2 to cause the DT matrix generation means 11 to generate the DT matrix 11A from the document set 21 and the term list 22. The control unit 10 also causes the DT matrix transformation means 12 to apply the DM decomposition processing in FIG. 6 to the DT matrix to generate the transformed DT matrix 11B in which the respective documents D are separated for the respective clusters.

Figure 8A:
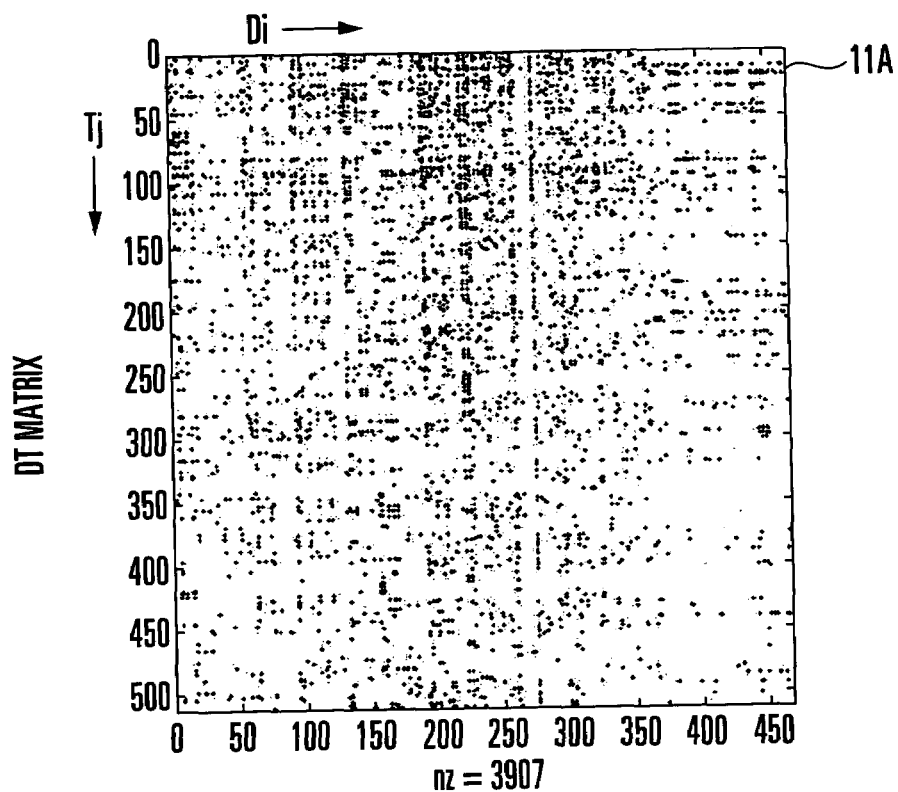
FIG. 8A is a view showing an example of a DT matrix.
Figure 8B:
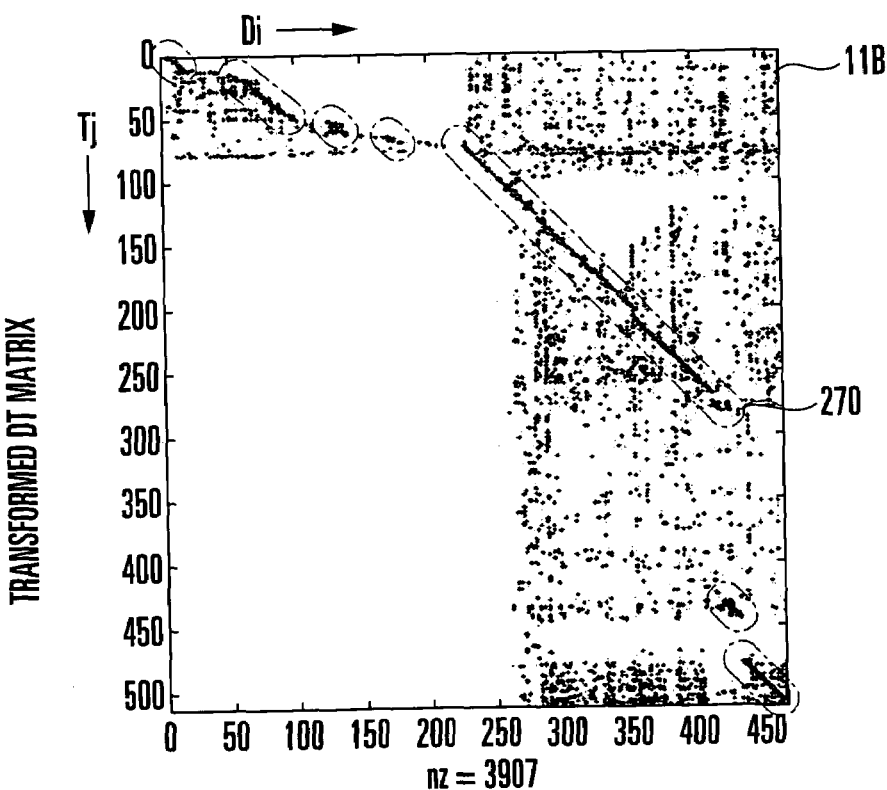
FIG. 8B is a view showing an example of a transformed DT matrix.

FIG. 8A shows an example of the DT matrix 11A. FIG. 8B shows an example of the transformed DT matrix 11B. In this case, if a term Tj exists in a given document Di, a dot is placed at the intersection between the document Di placed in the column direction (horizontal direction) and the term Ti placed in the row direction (vertical direction); otherwise, a blank is placed at the intersection. In the DT matrix 11A in FIG. 8A, dots are randomly distributed. In the transformed DT matrix 11B in FIG. 8B, dots are continuously and densely placed in an oblique direction in a fragmentary manner, and it is known that clusters are arrayed in a portion 270. In the transformed DT matrix 11B, no dot exists on the lower left side, and many dots exist on the upper right side, so it is known that an upper triangular matrix is formed.

[Document Classification Processing]

Figure 9:
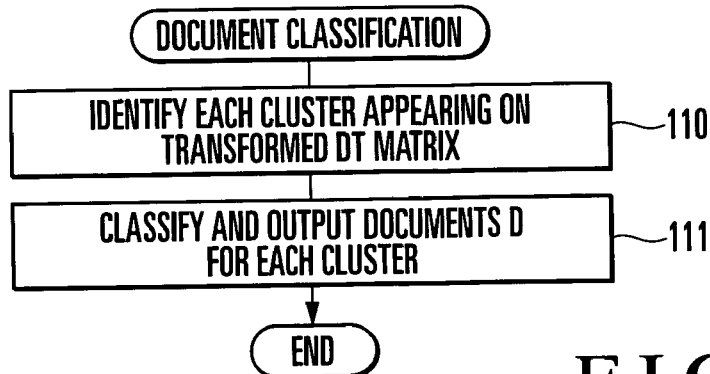
FIG. 9 is a flowchart showing document classification processing.

When the document set 21 is to be classified, the control unit 10 of the sentence classification device 1 executes the above DT matrix generation processing (see FIG. 2) first, and then executes the document classification processing in FIG. 9. FIG. 9 is a flowchart showing document classification processing. First of all, the document classification means 13 identifies each cluster appearing in the form of a block on the transformed DT matrix 11B generated by the DT matrix transformation means 12 (step 110). In this case, each cluster may be identified on the basis of a bipartite graph separated at the time of the generation of the transformed DT matrix 11B, or may be identified from a row of data (dots) on the transformed DT matrix 11B.

Figure 10:
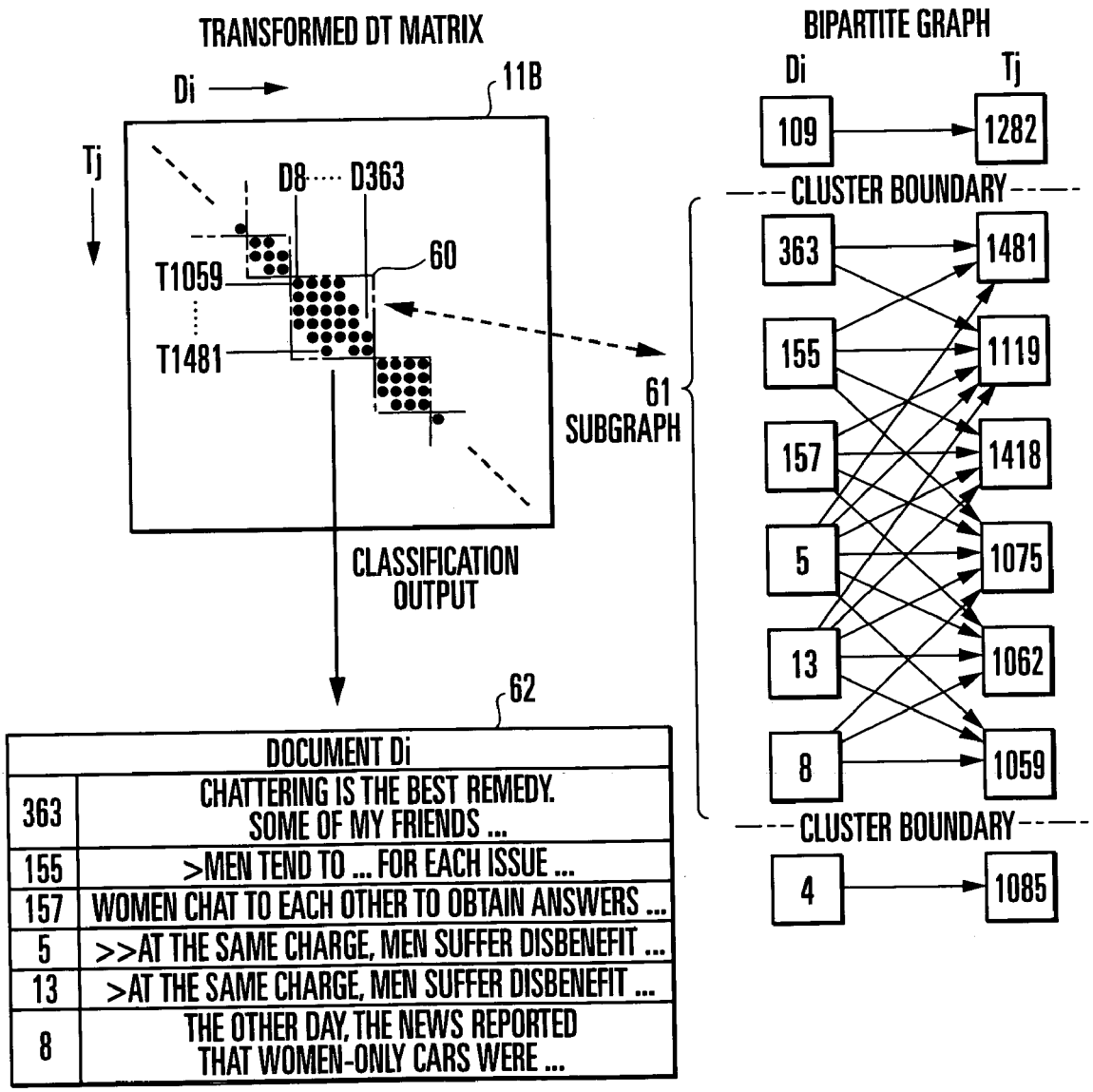
FIG. 10 is a view for explaining document classification processing.

FIG. 10 is a view for explaining document classification processing. In this case, a cluster 60 exists on the transformed DT matrix 11B. The cluster 60 forms a subgraph 61 expressed by a bipartite graph, and has little relevance with other documents and terms. Note that this cluster sometimes forms a complete graph with clear cluster boundaries. In the transformed DT matrix 11B, the documents D are arranged in the column direction (horizontal direction), and the documents D arranged in the column direction in the cluster 60, i.e., documents D363, D155, D157, D5, D13, and D8, are the documents D belonging to the cluster 60. The document classification means 13 extracts and classifies a subset 62 comprising documents belonging to each identified cluster as one classification from the document set 21 (step 111), and displays the resultant data on, for example, the screen display unit 40 or stores it in the storage unit 20, thus terminating the series of document classification processes.

As described above, in this embodiment, each document belonging to each cluster in the form of a block on the transformed DT matrix 11B is extracted/output as one classification, and hence each document can be classified without preparing any label corresponding to each classification in advance. This eliminates the necessity to select appropriate labels upon comprehending the content of each document as a classification target to some extent as in the prior art. Therefore, terms can be formed from words selected according to a criterion which is not directly associated with classification, e.g., a frequency of occurrence. This makes it possible to greatly reduce the work load for label selection.

In addition, these clusters are comprised of a plurality of documents associated with each other through a plurality of terms. This therefore makes it possible to not only extract documents containing the same term as one classification but also extract documents containing other terms which exist almost commonly in the documents as the same classification. That is, documents having commonality and relevance in terms of contents can be easily extracted as one classification. This makes it possible to flexibly perform classification in accordance with the contents and topics of documents from a new viewpoint beyond a conceivable range, as compared with a case wherein documents are classified on the basis of only the presence/absence of labels prepared in advance as in the prior art, instead of subjective classification limited to the labels.

[Label Generation Processing]

Figure 11:
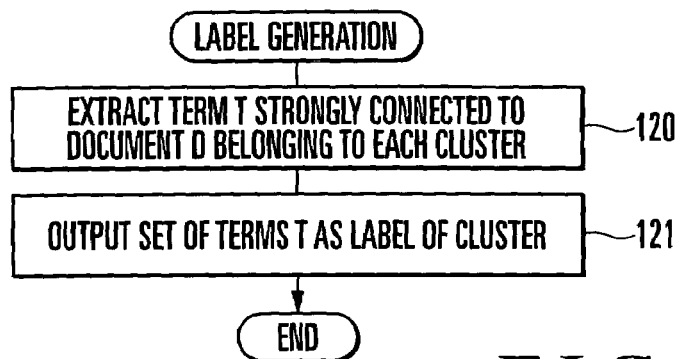
FIG. 11 is a flowchart showing label generation processing.

When labels are to be generated for the respective classifications of the documents classified by the document classification means 13, the control unit 10 of the sentence classification device 1 executes the above DT matrix generation processing (see FIG. 2) and the document classification processing (see FIG. 9) first, and then executes the label generation processing in FIG. 11. FIG. 11 is a flowchart showing the label generation processing. First of all, the label generation means 14 selects, from the transformed DT matrix 11B, the terms T strongly connected to the documents D belonging to classifications, i.e., clusters, for which labels are to be generated (step 120).

Figure 12:
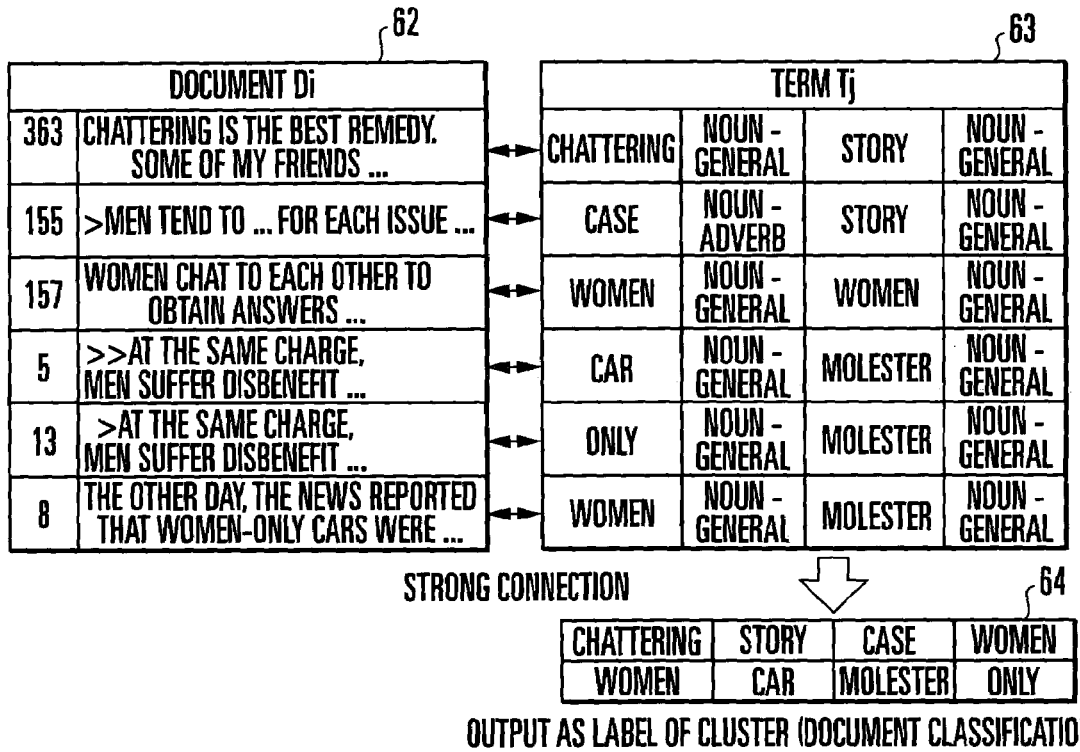
FIG. 12 is a view for explaining label generation processing.

FIG. 12 is a view for explaining the label generation processing. In this case, with respect to a subset 62 indicating documents belonging to arbitrary classifications, the terms T (63) in strong connection with the respective documents D are selected. Note that a strong connection indicates a pair of the document D and the term T which are connected to each other through bidirectional edges in a bipartite graph when the documents D are classified for the respective clusters in the transformed DT matrix 11B. In general, the document D and the term T which are in a strong connection are diagonally placed in the corresponding cluster on the transformed matrix. The words of the respective selected terms T are output as labels 64 of the corresponding classifications (step 121), and the result is, for example, displayed on the screen display unit 40 or stored in the storage unit 20, thus terminating the series of label generation processes.

In this embodiment, since the term T strongly connected to each document belonging to a cluster of a target classification is output as the label of the corresponding classification, an appropriate label expressing a feature of each classification by using a word can be easily generated even in a case wherein documents are not classified on the basis of labels as in this embodiment.

[Document Organization Processing]

Figure 13:
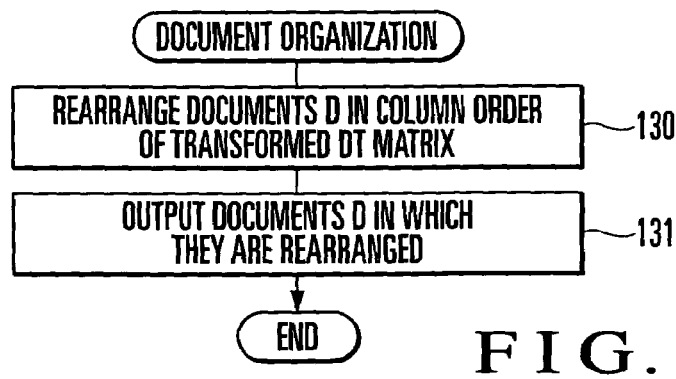
FIG. 13 is a flowchart showing document organization processing.
Figure 14:
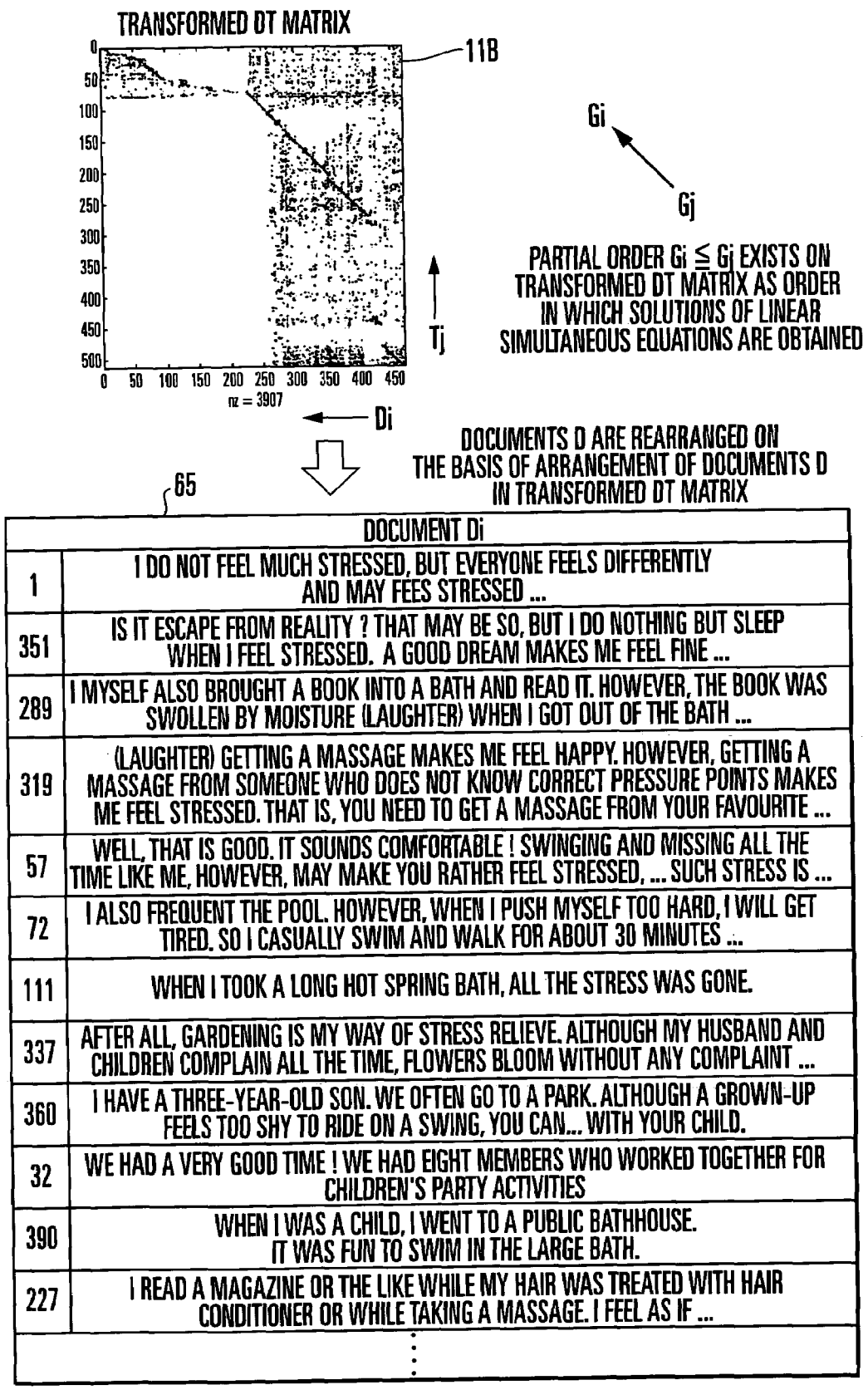
FIG. 14 is a view for explaining document organization processing.

When the arrangement of the respective documents D is to be organized, the control unit 10 of the sentence classification device 1 executes the above DT matrix generation processing (see FIG. 2) first, and then executes the document organization processing in FIG. 13. FIG. 13 is a flowchart showing the document organization processing. First of all, the document organization means 15 rearranges the respective documents D on the basis of the arrangement on the transformed DT matrix 11B (step 130). FIG. 14 is a view for explaining the document organization processing. As described above, in the transformed DT matrix 11B obtained by transforming the DT matrix by the DM decomposition method, the respective documents D are arranged through the terms T such that the adjacent documents have high relevance. The document organization means 15 organizes the documents D rearranged on the basis of the transformed DT matrix 11B, outputs organized documents 65 (step 131), and, for example, displays the result on the screen display unit 40 or stores it in the storage unit 20, thus terminating the series of document organization processes.

In the transformed DT matrix 11B, in particular, a predetermined partial order exists in the arrangement of the documents D and terms T. For example, the DT matrix 11A can be regarded as a matrix indicating linear simultaneous equations of the documents D with the terms T serving as variables. The transformed DT matrix 11B indicates the result of the rearrangement of the documents D in an order almost conforming to the order in which solutions G of these equations are obtained. This also reveals that the documents D are arranged on the transformed DT matrix 11B such that the adjacent documents have high relevance.

In this manner, in this embodiment, since the documents D are rearranged and output on the basis of the arrangement of the documents D on the transformed DT matrix, documents having common terms, i.e., words, and high relevance are sequentially obtained, thereby obtaining commonality in terms of topics between the adjacent documents D. That is, since documents having similar contents are sequentially arranged, the documents can be read without interruption in terms of context and the contents of the clusters, and furthermore, the overall document set can be easily comprehended as compared with a case wherein the documents D are read at random. In this case, the documents D contained in an arbitrary cluster, i.e., classification, may be generated into one document as a document organization target, or all the documents D contained in the document set 21 may be generated into one document as a document organization target.

[Summary Generation Processing]

Figure 15:
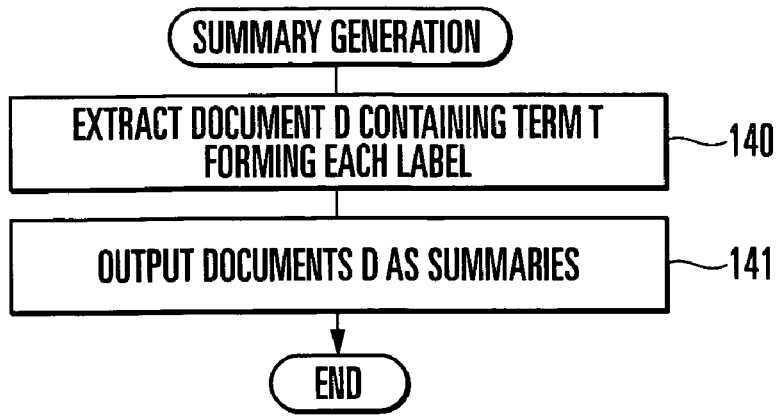
FIG. 15 is a flowchart showing summary generation processing.

When a summary of an arbitrary document D comprising a plurality of sentences is to be generated, the control unit 10 of the sentence classification device 1 executes the above DT matrix generation processing (see FIG. 2) first, and then executes the summary generation processing in FIG. 15. FIG. 15 is a flowchart showing the summary generation processing. With regard to the document D as a target, the summary generation means 16 selects the terms T strongly connected to the document D from the transformed DT matrix 11B in the same manner as in the above label generation processing (step 140).

Figure 16:
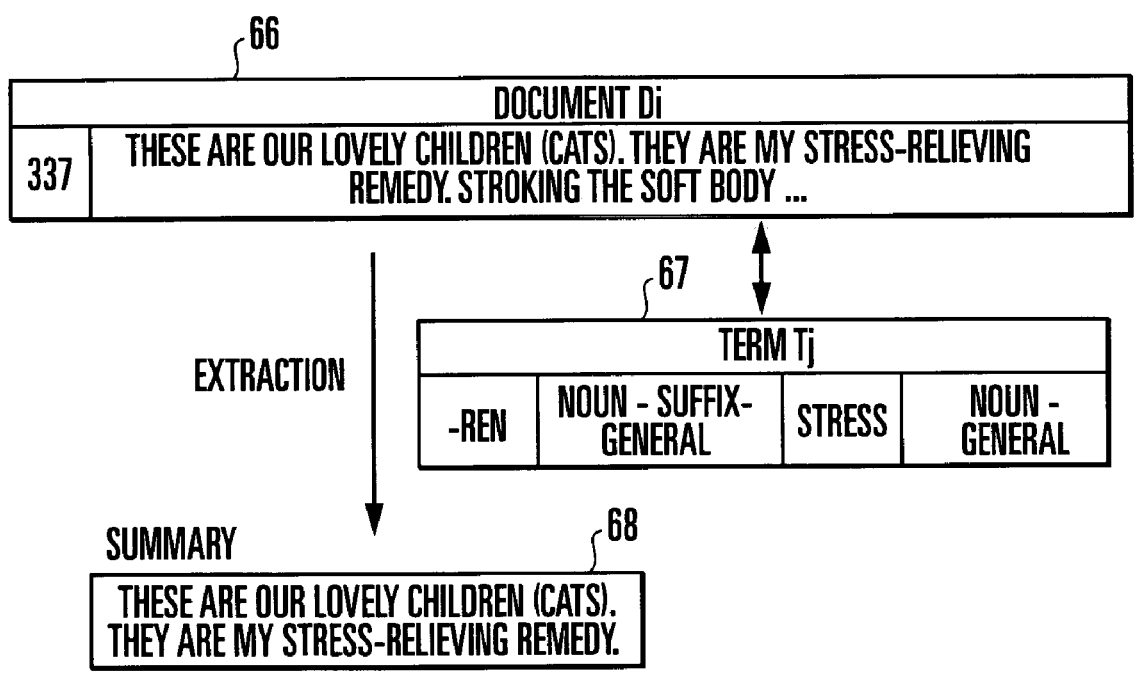
FIG. 16 is a view for explaining summary generation processing.

FIG. 16 is a view for explaining the summary generation processing. In general, the document D (66) is comprised of a plurality of sentences, and the terms T (67) strongly connected to the document D are contained in any of the sentences. In this case, the terms T indicate features of the document D. The summary generation means 16 selects the sentences containing the terms T from the document D, outputs the sentences as a summary 68 of the document D (step 141), and, for example, displays the result on the screen display unit 40 or stores it in the storage unit 20, thus terminating the series of summary generation process.

In this manner, according to this embodiment, on the basis of the terms T strongly connected to the document D as a target, sentences containing the terms are output as a summary of the document D. Therefore, a summary of the document D can be easily and properly generated.

[Term List Generation Processing]

The term list generation means 18 automatically generates the term list 22 from the document set 21. Various kinds of algorithms have been proposed as methods of extracting, from a document, important words which characterize the document. For example, an algorithm such as TFIDF (Term Frequency Inverse Document Frequency) may be used, which calculates the importance of each word, and selects important words on the basis of the importances. Alternatively, an algorithm called KeyGraph may be used, which extracts phrases (collocations) which are not based on linguistic interpretation without using any dictionary (see, for example, Kenji Kita et al., "Information Retrieval Algorithm", Kyoritsu Shuppan, 2002).

The term list generation means 18 generates the term list 22 by using such a known algorithm. In this embodiment, in order to specify such words, the part-of-speech attribute of each word is obtained in advance by morphological analysis, and an important word comprises a word and its part-of-speech attribute as a pair. In addition, in this embodiment, what defines the order of occurrence of two important words is defined as a term. This makes it possible to express the contents of a document more appropriately with a term. Note that the term list 22 may be generated by the term list edition means 17 in accordance with an instruction from the operation input unit 30, or a term list prepared in advance through the data input/output I/F unit 50 may be input from outside the device.

[Index Generation Processing]

Figure 17:
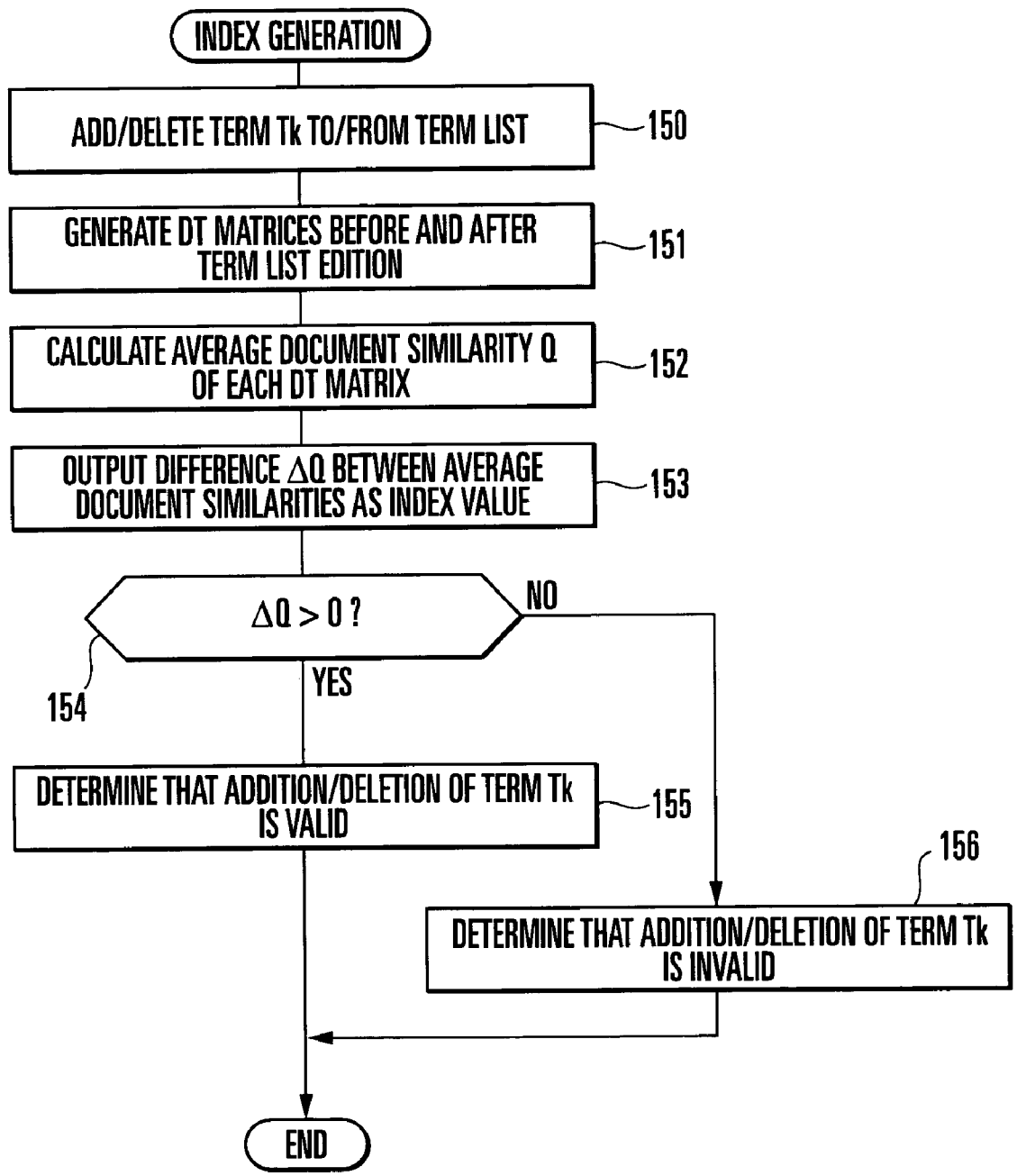
FIG. 17 is a flowchart showing index generation processing.

The term list 22 is an important factor in generating the transformed DT matrix 11B and classifying the documents, and hence can be edited by the term list edition means 17. In this embodiment, the index generation means 19 of the control unit 10 generates an objective evaluation value for the edited term list, and generates an index for the edition. Index generation processing in the index generation means 19 will be described below with reference to FIG. 17. FIG. 17 is a flowchart showing the index generation processing.

Assume that the term list edition means 17 adds a term Tk to or deletes it from the term list 22 to generate a new term list (step 150). The index generation means 19 generates DT matrices with respect to the term lists before and after the edition by using the DT matrix generation means 11 (step 151), and calculates an average document similarity Q of each DT matrix (step 152). The average document similarity Q is obtained by calculating similarities sim(Di, Dj) between all pairs of documents Di and Dj and averaging the similarities. Letting N be the number of documents D, Q is calculated by equation (1) given below:

$$Q = \frac{1}{N(N-1)} \sum_{i=1}^{N} \sum_{\substack{j=1 \\ i \neq j}}^{N} sim(Di, Dj) \tag{1}$$

In this case, letting X and Y be vectors indicating the presence/absence of each term T in the documents Di and Dj with 0/1, the similarity sim(Di, Dj) is calculated on the basis of the transformed DT matrix according to, for example, equations (2) to (4). More specifically, equation (2) represents the inner product of the vectors X and Y as a similarity, equation (3) represents the Dice coefficient between the vectors X and Y as a similarity, and equation (4) represents the Jaccard coefficient between the vectors X and Y as a similarity.

$$sim(Di, Dj) = |X \cap Y| = \sum_{i=1}^{t} xi \cdot yi \tag{2}$$

$$sim(Di, Dj) = \frac{2|X \cap Y|}{|X| + |Y|} \tag{3}$$

$$sim(Di, Dj) = \frac{|X \cap Y|}{|X| + |Y| - |X \cap Y|} \tag{4}$$

In this manner, the index generation means 19 calculates the average document similarity Q on the basis of the DT matrix generated from the term list before the edition, and calculates an average document similarity Qk on the basis of the DT matrix generated from the term list after the edition. The index generation means 19 then calculates a difference ΔQ between these similarities according to equation (5), and displays the difference as an index value on the screen display unit 40 (step 153).

$$\Delta Q = Qk - Q \tag{5}$$

In this case, if the difference ΔQ is larger than 0 (step 154: YES), the DT matrix generated from the term list after the edition exhibits higher similarities between the respective documents, and hence the respective documents can be effectively classified. Therefore, information indicating that the edition is valid is displayed on the screen display unit 40 (step 155), and the series of index generation processes is terminated.

If it is determined in step 154 that the difference ΔQ is equal to or less than 0 (step 154: NO), the DT matrix generated from the term list after the edition exhibits lower similarities between the respective documents, and hence the respective documents cannot be effectively classified. Therefore, information indicating that the edition is invalid is displayed on the screen display unit 40 (step 156), and the series of index generation processes is terminated. Note that only the difference ΔQ may be displayed as an index to make the operator determine the validity of the edition. Alternatively, only information indicating "valid" or "invalid" with respect to the edition may be displayed.

In this manner, according to this embodiment, the index generation means 19 calculates the average document similarities Q on the basis of the DT matrices generated from term lists before and after edition, and generates an index indicating the validity of the edition on the basis of a change in similarity. This makes it possible to easily comprehend the validity of the edition for the term list 22. Therefore, a term list can be easily and properly edited, and documents can be efficiently classified by the edition in accordance with a desired intention or purpose. In addition, since an index is generated on the basis of the average document similarities obtained from DT matrices, documents need not be classified, and processing required for index generation can be simplified. Therefore, it can be easily determined whether the edition is valid or invalid. This can greatly reduce the work load required for the edition of a term list.

Although the above description has exemplified the case wherein the average document similarities Q are used to determine whether the edition is valid or invalid, the present invention is not limited to this. For example, whether the edition is valid or invalid may be determined on the basis of a document classification result, e.g., the number of classifications or the number of documents belonging to one classification.

Second Embodiment

Figure 18:
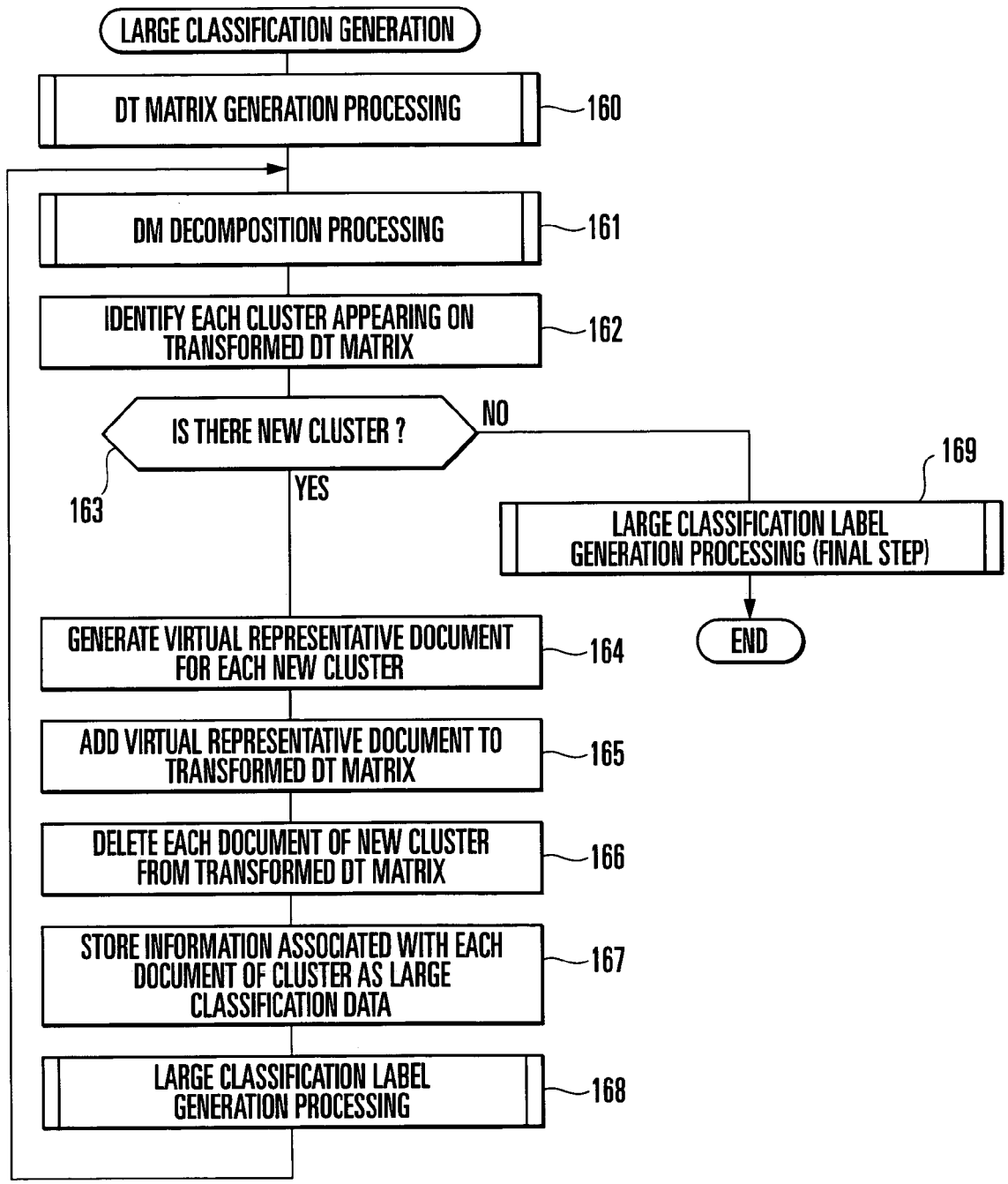
FIG. 18 is a flowchart showing large classification generation processing.

A sentence classification device according to the second embodiment of the present invention will be described next with reference to FIG. 18. FIG. 18 is a flowchart showing large classification generation processing in the sentence classification device according to the second embodiment of the present invention. Note that the arrangement of the sentence classification device according to this embodiment is the same as that of the sentence classification device according to the first embodiment described above (see FIG. 1), and a detailed description thereof will be omitted.

The first embodiment described above has exemplified the processing of generating a DT matrix two-dimensionally expressing the relationship between documents and terms, transforming the DT matrix on the basis of the DM decomposition method used in the graph theory, and classifying the respective documents by using the clusters identified on the obtained transformed DT matrix. According to the above classification processing, documents can be classified to some extent as a document set for each cluster. However, this processing cannot cope with a larger classification including one or more clusters, i.e., a large classification, and the hierarchical relationship between clusters. This embodiment is directed to generate large classifications of documents by using a large classification generation means 71, virtual representative generation means 72, and large classification label generation means 73 provided for a control unit 10 of a sentence classification device 1.

[Operation of Second Embodiment (Large Classification Generation Processing)]

Large classification generation processing of generating large classifications of documents will be described in detail next as the operation of the sentence classification device according to the second embodiment of the present invention with reference to FIG. 18.

The control unit 10 starts the large classification generation processing in FIG. 18 by using the large classification generation means 71 in accordance with an instruction from the operation input unit 30. First of all, the large classification generation means 71 reads a document set 21 and term list 22 stored in a storage unit 20 by using a DT matrix generation means 11, and generates a DT matrix two-dimensionally expressing the relationship between the respective documents and the respective terms by performing DT matrix generation processing like that described above (step 160).

The large classification generation means 71 generates a transformed DT matrix 11B, in which the respective documents are separated for each cluster, by applying the DM decomposition method in the graph theory to the above DT matrix using a DT matrix transformation means 12 in the same manner as described above (step 161). The large classification generation means 71 identifies the respective clusters in the form of blocks on the obtained transformed DT matrix in the same manner as the document classification means 13 described above (step 162).

If a new cluster is identified (step 163: YES), a virtual representative document virtually representing the cluster for each new cluster is generated by using the virtual representative generation means 72. First of all, the virtual representative generation means 72 acquires the feature amounts of the respective documents belonging to the new cluster, and generates a virtual representative document from the sum-set of the feature amounts. If, for example, a feature amount Ki of each document is expressed by one or more feature amounts k1 to kn as indicated by equation (6), a virtual representative document K' can be obtained by equation (7):

$$Ki = \{k1, k2, \ldots, kn\} \quad (6)$$

$$K' = K1 \cup K2 \cup \ldots \cup Km \quad (7)$$

In this case, if, for example, terms are used as feature amounts as described above, a virtual representative document is a sum-set containing all the terms which the documents belonging to the new cluster have. The contents of this sum-set are a list of keywords constituting the respective terms.

The large classification generation means 71 generates a virtual representative document for each new cluster by using the virtual representative generation means 72 in the above manner, and assigns a new document number to each document (step 164). The large classification generation means 71 adds these virtual representative documents to the transformed DT matrix as the same documents as other actual documents (real documents) (step 165). The large classification generation means 71 then deletes the respective documents belonging to the new clusters from the transformed DT matrix (step 166). With this processing, on the transformed DT matrix, dots are additionally placed at the intersections between the virtual representative documents and the respective terms contained in the documents, and the dots corresponding to the respective original documents are deleted, thereby generating a new DT matrix in which the respective documents constituting the new clusters are replaced with the virtual representative documents.

Subsequently, the large classification generation means 71 outputs, as large classification data 23, the arrangement of each new cluster, e.g., information associated with the respective documents constituting the cluster, for example, the real documents belonging to the cluster, the document number of the virtual representative document, and the number of steps, and stores the data in the storage unit 20 (step 167). With respect to the virtual representative document contained in the new cluster, the large classification generation means 71 then performs large classification label generation processing (to be described later) for the cluster on which the virtual representative document is based (step 168).

In this manner, in steps 161 to 168 which are regarded as one step, a new cluster is generated by performing transformation processing for a DT matrix, and clustering processing is executed, in which a new DT matrix is generated by replacing the cluster with a virtual representative document. Thereafter, the flow returns to step 161 to repeatedly execute clustering processing using the new DT matrix. With this processing, each cluster generated in a repetitive step of clustering processing contains not only real documents but also virtual representative documents, i.e., other clusters, thereby obtaining a large classification of the respective documents.

Figure 19:
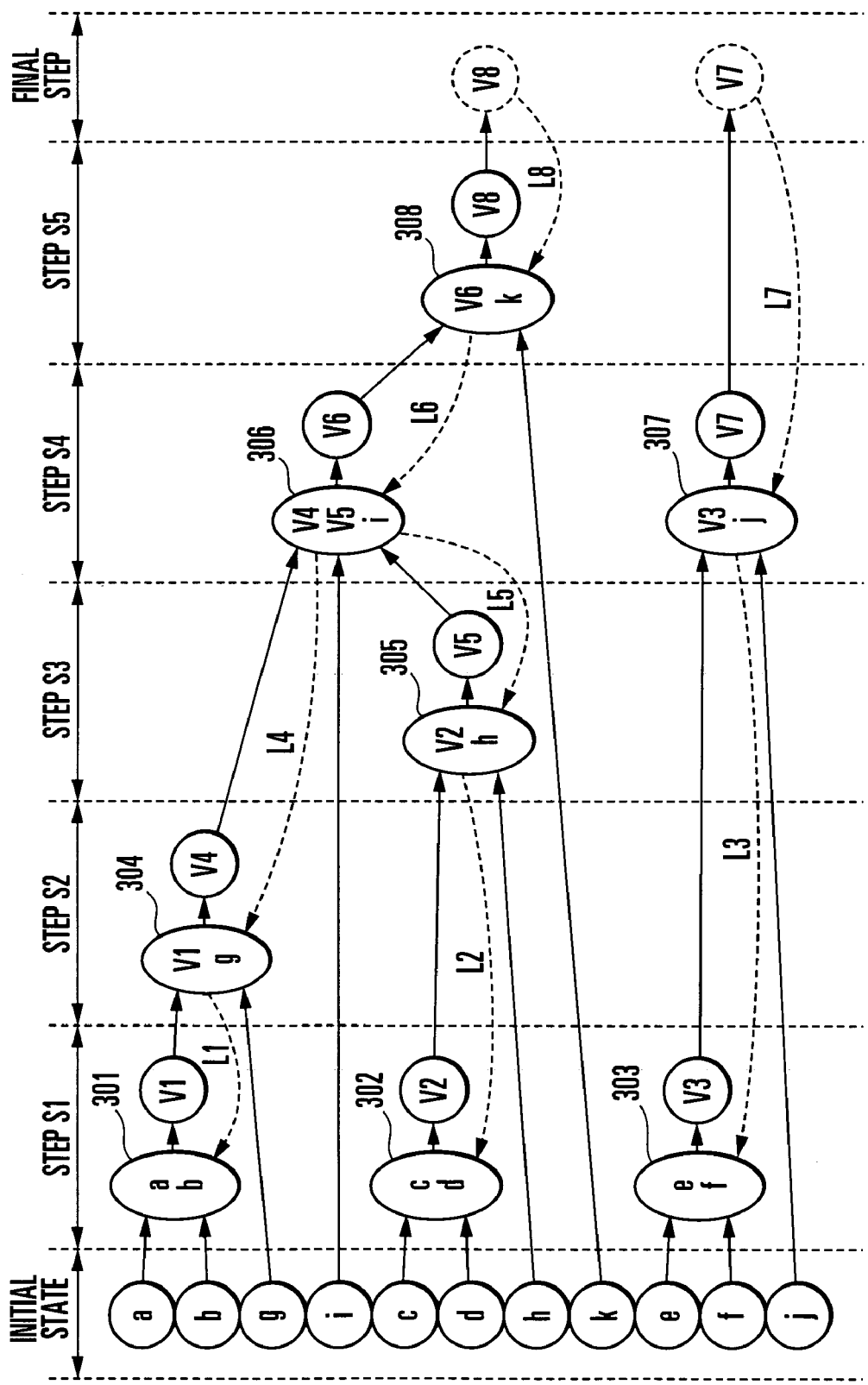
FIG. 19 is a view for explaining an execution example of large classification generation processing.

FIG. 19 shows an execution example of large classification generation processing. Assume that in the initial state, documents a to k are stored in the document set 21 in the storage unit 20. In step S1 which is the first clustering processing, a cluster 301 is generated from the documents a and b, and a virtual representative document V1 of the cluster is generated. Likewise, a cluster 302 is generated from the documents c and d, and a virtual representative document V2 of the cluster is generated. In addition, a cluster 303 is generated from the documents e and f, and a virtual representative document V3 of the cluster is generated.

With this operation, at the end of step S1, the documents a, b, c, d, e, and f are deleted from the DT matrix, and step S2 is executed by using a new DT matrix comprising the documents g to k and the virtual representative documents V1, V2, and V3. In second step S2, a cluster 304 is generated from the virtual representative document V1 and the document g, and a virtual representative document V4 of the cluster is generated. In this case, in the large classification label generation processing in step 168 in FIG. 18, since the virtual representative document V1 is contained in the cluster 304, a large classification label for the cluster 301 on which the virtual representative document V1 is based is generated.

Figure 20:
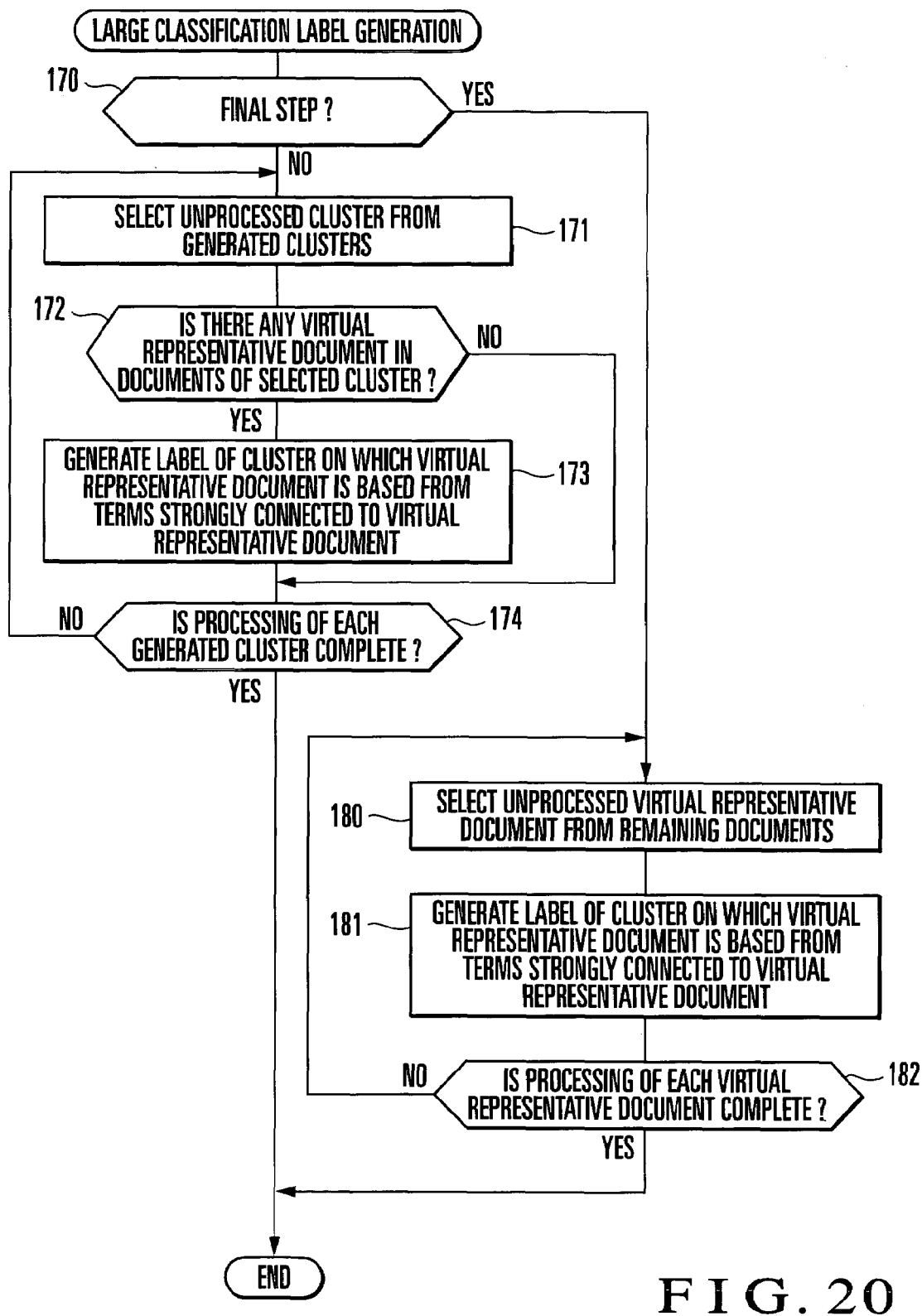
FIG. 20 is a flowchart showing large classification label generation processing.

Large classification label generation processing will be described with reference to FIG. 20. First of all, the large classification label generation means 73 determines whether the current step in the large classification generation processing is the final step in which no new cluster is found (step 170). If the current step is not the final step (step 170: NO), one of the new clusters identified in step 162 in FIG. 18 is arbitrarily selected, for which the label generation processing has not been performed (step 171), and it is determined whether any virtual representative document is contained in the selected cluster (step 172). It suffices to identify a real document and a virtual representative document with their document numbers or the like. In this case, only when a virtual representative document is contained in the cluster (step 172: YES), a label for the cluster on which the virtual representative document is based is generated from the keywords of terms strongly connected to the virtual representative document on the DT matrix (step 173).

If there is any cluster for which the label generation processing has not been performed (step 174: NO), the flow returns to step 171 to repeatedly execute the label generation processing in steps 171 to 173 for the unprocessed cluster. When the processing for each cluster is complete (step 174: YES), the series of large classification generation processes is terminated.

If it is determined in step 170 that the current step in the large classification generation processing is the final step (step 170: YES), one virtual representative document for which the label generation processing has not been performed is arbitrarily selected from the respective documents constituting the DT matrix at the end of the final step (step 180), and a label for the cluster on which the virtual representative document is based is generated from the keywords of terms strongly connected to the virtual representative document on the DT matrix (step 181). If there is any virtual representative document for which the label generation processing has not been performed (step 182: NO), the flow returns to step 180 to repeatedly execute the label generation processing in steps 180 and 181 for the unprocessed virtual representative document (step 182: YES), thus terminating the series of large classification generation processes.

In step S2 in FIG. 19, since the virtual representative document V1 is contained in the cluster 304, a label L1 for the cluster 301 on which the virtual representative document V1 is based is generated from the keywords of terms strongly connected to the virtual representative document V1 on the DT matrix at the start of processing in step S2. Subsequently, in the same manner as described above, in step S3, a cluster 305 is generated from the virtual representative document V2 and the document h, and a virtual representative document V5 of the cluster is generated. A label L2 for the cluster 305 on which the virtual representative document V2 is based is generated.

In step S4, a cluster 306 is generated from the virtual representative documents V4 and V5 and the document i, and a virtual representative document V6 of the cluster is generated. In addition, a cluster 307 is generated from the virtual representative document V3 and the document j, and a virtual representative document V7 of the cluster is generated. A label L4 for the cluster 304 on which the virtual representative document V4 is based is generated. In addition, a label L5 for the cluster 305 on which the virtual representative document V5 is based is generated. Furthermore, a label L3 for the cluster 303 on which the virtual representative document V3 is based is generated. In step S5, a cluster 308 is generated from the virtual representative document V6 and the document k, and a virtual representative document V8 of the cluster is generated. A label L6 for the cluster 306 on which the virtual representative document V6 is based is then generated.

The large classification generation means 71 repeatedly executes the clustering processing (steps 161 to 168) in this manner. If no new cluster is found in step 163 in FIG. 18 (step 163: NO), large classification label generation processing is executed as the final step for the cluster to which no large classification label is attached (step 169), thus terminating the series of large classification generation processes.

With this operation, in the final step in FIG. 19, a label L8 for the cluster on which the virtual representative document V8 is based is generated from the keywords of terms strongly connected to the virtual representative document V8 on the DT matrix at this point of time. In the same manner, a label L7 for the cluster 307 on which the virtual representative V7 is based is generated.

Figure 21:
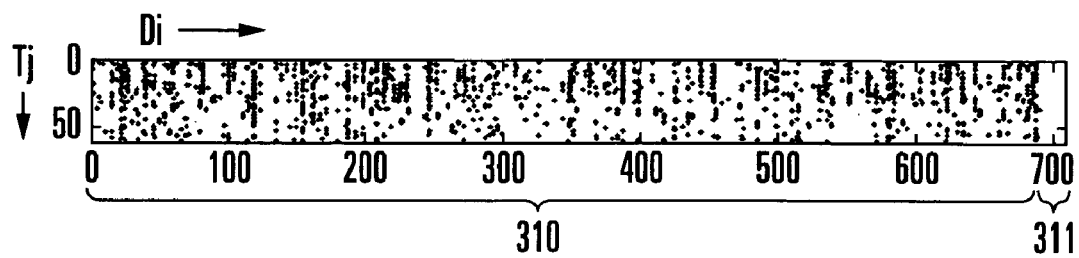
FIG. 21 is a view showing an example of how a DT matrix is generated (initial state)
Figure 22:
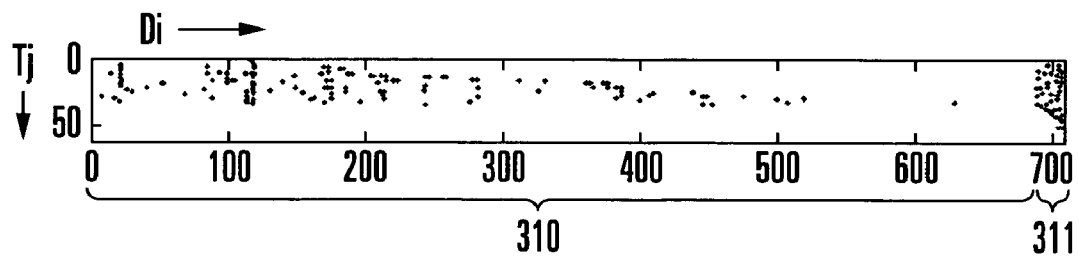
FIG. 22 is a view showing an example of how a DT matrix is generated (final step).

FIG. 21 shows an example of how a DT matrix is generated in the initial state. If a term Tj exists in each document Di, dots are placed at the intersections between the documents Di placed in the column direction (horizontal direction) and the terms Tj placed in the row direction (vertical direction). If no term Tj exists in any document, a blank is placed at the corresponding intersection. Note that in this DT matrix, real documents are placed along the abscissa in an area 310, and an area 311 is a blank in the initial state because a virtual representative document is to be placed in this area. FIG. 22 shows an example of how a DT matrix is generated in the final step. Obviously, in this example, real documents are deleted from the area 310 to make the area almost blank by the large classification generation processing, and the blank in the area 311 is replaced with a virtual representative document.

In this manner, according to this embodiment, since clustering processing of generating a new cluster by performing transformation processing with respect to a DT matrix and generating a new DT matrix by replacing the cluster with its virtual representative document is repeatedly executed, new clusters, i.e., larger clusters including clusters, i.e., large classifications, can be sequentially obtained from new DT matrices. With this operation, as the large classification data 23 in the storage unit 20, as shown in FIG. 19, not only a classification having only each of the documents a to k as an element, e.g., the clusters 301 to 303, but also a larger classification containing one or more clusters, i.e., a large classification, can be obtained.

In addition, since the above clustering processing is repeatedly executed until no new cluster is identified on a DT matrix, hierarchical clustering is performed from each document in a bottom-up manner, and the hierarchical relationship between the clusters 301 to 308, i.e., the large classifications, can be visualized as a tree structure.

The above description has exemplified the case wherein large classification label generation processing (steps 168 and 169) is performed in large classification generation processing (see FIG. 18). If no large classification label is required, large label generation processing may be omitted from large classification generation processing. In addition, large classification label generation processing need not be performed in cooperation with large classification generation processing. After large classification generation processing is complete, large classification label generation processing (see FIG. 20) may be independently performed as needed.

Furthermore, the respective embodiments described above may be executed separately or in combination.

INDUSTRIAL APPLICABILITY

The sentence classification device and method according to the present invention are useful in classifying a document set including documents with various contents, and is particularly suitable for classifying and analyzing comments, replies to questionnaires (free-format sentences), and the like input by an unspecified number of users through a network such as the Internet.

The invention claimed is:

1. A sentence classification device comprising:
a processor;
a memory for storing a plurality of terms;
a term list having the plurality of terms each term comprising not less than one word;
a Document Term (DT) matrix generation module for generating a DT matrix two-dimensionally expressing a relationship between each document contained in a document set and said each term;
a DT matrix transformation module for generating a transformed DT matrix having respective clusters, each cluster having one or more blocks of associated documents, by transforming the DT matrix obtained by said DT matrix generation module on a basis of a DM decomposition method used in a graph theory to enable document classification without having to preselect cluster categories;
a classification generation module for generating classifications associated with the document set on a basis of a relationship between each cluster on the transformed DT matrix obtained by said DT matrix transformation module and said each document classified according to the clusters, wherein the classification generation module comprises a virtual representative document generation module for generating a virtual representative document, for each cluster on the transformed DT matrix, from a term of each document belonging to the cluster;
a large classification generation module for generating a large classification of documents from each document in a bottom-up manner by repeatedly performing, at each DT matrix transformation, said DM decomposition method used to hierarchically cluster documents by setting said DT matrix generated by said DT matrix generation module in an initial state, causing said virtual representative document generation module to generate a virtual representative document for each cluster on the transformed DT matrix generated from the DT matrix by said DT matrix transformation module, generating a new DT matrix used for next hierarchical clustering processing by adding a virtual representative document to the transformed DT matrix and deleting documents belonging to the cluster of the virtual representative document from the transformed DT matrix, and outputting, for said each cluster, information associated with the documents constituting the respective cluster as large classification data of one or more cluster categories;
a term list edition module for adding or deleting an arbitrary term with respect to the term list;
an index generation module for making said DT matrix generation module generate DT matrices by using term lists before and after edition by said term list edition module, and generating and outputting an index indicating validity of the edition from the DT matrices,
a large classification label generation module for, if a virtual representative document is contained in a given cluster of the respective clusters obtained by the clustering processing, generating a label of the given cluster on which the virtual representative document is based from a term strongly connected to the virtual representative document subsequent to classification of the documents into the respective clusters,
wherein said large classification generation module terminates repetition of the clustering processing when no cluster is obtained from the transformed DT matrix in the clustering processing.

2. The sentence classification device according to claim 1, characterized by further comprising label generation module for outputting each term strongly connected to each document belonging to said arbitrary cluster as a label indicating a classification of the cluster.

3. The sentence classification device according to claim 1, further comprising a document organization module for sequentially outputting documents belonging to said arbitrary cluster or all documents in an arrangement order of the documents in the transformed DT matrix.

4. The sentence classification device according to claim 1, further comprising a summary generation module for outputting, as a summary of said arbitrary document, a sentence of sentences constituting the document which contains a term strongly connected to the document.

5. A sentence classification method comprising:
generating, by using a computer, a Document Term (DT) matrix two-dimensionally expressing a relationship between each document contained in a document set and each term of a term list having a plurality of terms each comprising not less than one word;

generating a transformed DT matrix having respective clusters, each cluster having, one or more blocks of associated documents, by transforming the DT matrix on a basis of a DM decomposition method used in a graph theory to enable document classification without having to preselect cluster categories;

generating classifications associated with the document set on a basis of a relationship between each respective cluster on the transformed DT matrix and said each document classified according to the respective clusters, wherein the generating comprises a virtual representative document generation step of generating a virtual representative document, for each respective cluster on the transformed DT matrix, from a term of each document belonging to the respective cluster;

generating a large classification of documents from each document in a bottom-up manner by repeatedly performing, at each DT matrix transformation, said DM decomposition method used to hierarchically cluster documents by setting said DT matrix generated in said DT matrix generation step in an initial state, generating a virtual representative document in a virtual representative document generation step for each respective cluster on the transformed DT matrix generated from the DT matrix in the DT matrix transformation step, the step of generating a new DT matrix used for next hierarchical clustering processing by adding the virtual representative document to the transformed DT matrix and deleting documents belonging to the cluster of the virtual representative document from the transformed DT matrix, and the step of outputting, for said each respective cluster, information associated with the documents constituting the respective cluster as large classification data of one or more cluster categories; and adding or deleting an arbitrary term with respect to the term list; and the step of generating DT matrices by using term lists before and after edition, and generating and outputting an index indicating validity of the edition from the DT matrices, and in large classification label generation, if a virtual representative document is contained in a given cluster of the respective clusters obtained by the clustering processing, generating a label of the given cluster on which the virtual representative document is based from a term strongly connected to the virtual representative document subsequent to classification of the documents into the respective clusters, wherein in the large classification generation step, repetition of the clustering processing is terminated when no cluster is obtained from the transformed DT matrix in the clustering processing.

6. The sentence classification method according to claim 5, characterized by further comprising the step of outputting each term strongly connected to each document belonging to said arbitrary cluster as a label indicating a classification of the cluster.

7. The sentence classification method according to claim 5, further comprising the step of sequentially outputting documents belonging to said arbitrary cluster or all documents in an arrangement order of the documents in the transformed DT matrix.

8. The sentence classification method according to claim 5, further comprising the step of outputting, as a summary of a document, a sentence of sentences constituting said arbitrary document which contains a term strongly connected to the document.

\* \* \* \* \*